(12) United States Patent
Iwabuki et al.

(10) Patent No.: US 11,527,947 B2
(45) Date of Patent: Dec. 13, 2022

(54) POWER CONVERSION DEVICE HAVING A CONFIGURATION FOR SIMULTANEOUS WIRED AND WIRELESS CHARGING

(71) Applicant: Mitsubishi Electric Corporation, Tokyo (JP)

(72) Inventors: Hiroyasu Iwabuki, Tokyo (JP); Tomokazu Sakashita, Tokyo (JP); Ryota Kondo, Tokyo (JP); Takaaki Takahara, Tokyo (JP); Hiroto Mizutani, Tokyo (JP); Takuya Nakanishi, Tokyo (JP); Yusuke Higaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 102 days.

(21) Appl. No.: 17/257,868

(22) PCT Filed: May 14, 2019

(86) PCT No.: PCT/JP2019/019073
§ 371 (c)(1),
(2) Date: Jan. 5, 2021

(87) PCT Pub. No.: WO2020/049801
PCT Pub. Date: Mar. 12, 2020

(65) Prior Publication Data
US 2021/0313870 A1    Oct. 7, 2021

(30) Foreign Application Priority Data
Sep. 3, 2018  (JP) .............................. JP2018-164114

(51) Int. Cl.
*H02M 1/00* (2006.01)
*H02J 50/10* (2016.01)
(Continued)

(52) U.S. Cl.
CPC ........... *H02M 1/0048* (2021.05); *B60L 53/22* (2019.02); *H02J 50/10* (2016.02); *H02M 1/007* (2021.05);
(Continued)

(58) Field of Classification Search
CPC ... H02M 1/0048–0058; H02M 1/0025; H02M 1/0064; H02M 1/0067; H02M 1/42;
(Continued)

(56) References Cited

U.S. PATENT DOCUMENTS

| 9,381,821 B2 | 7/2016 | Keeling et al. |
| 10,461,553 B2 | 10/2019 | Shimada et al. |

(Continued)

FOREIGN PATENT DOCUMENTS

| JP | 2015-208171 A | 11/2015 |
| JP | 2016-152687 A | 8/2016 |

(Continued)

OTHER PUBLICATIONS

International Search Report and Written Opinion dated Aug. 6, 2019, received for PCT Application No. PCT/JP2019/019073, Filed on May 14, 2019, 8 pages including English Translation.

*Primary Examiner* — Thienvu V Tran
*Assistant Examiner* — Carlos O Rivera-Perez
(74) *Attorney, Agent, or Firm* — Xsensus LLP

(57) ABSTRACT

An output terminal of a contact type charger connected to an AC power supply 1 and being for boosting or stepping down an input voltage, and an output terminal of a non-contact type charger for receiving power in a non-contact manner are connected to an input terminal of a DC/DC converter via an integrated bus, a DC link capacitor is connected between an AC/DC converter and an isolated DC/DC converter included in the contact type charger, an integrated capacitor is connected to the integrated bus, and a control circuit (Continued)

adjusts a DC voltage of the DC link capacitor or the integrated capacitor such that at least one of power losses or a total power loss of the contact type charger, the non-contact type charger, and the DC/DC converter is reduced.

16 Claims, 13 Drawing Sheets

(51) Int. Cl.
  *B60L 53/22* (2019.01)
  *H02M 3/335* (2006.01)
  *H02M 7/219* (2006.01)

(52) U.S. Cl.
  CPC ....... *H02M 3/33584* (2013.01); *H02M 7/219* (2013.01); *B60L 2210/10* (2013.01); *B60L 2210/30* (2013.01)

(58) Field of Classification Search
  CPC ............. H02M 1/4208; H02M 1/4216; H02M 1/4225; H02M 1/4233; H02M 1/4241; H02M 1/425; H02M 1/4258; H02M 1/4283; H02M 3/155; H02M 3/156; H02M 3/1566; H02M 3/158; H02M 3/335; H02M 3/33569; H02M 3/33571; H02M 3/33573; H02M 3/33576; H02M 3/33584; H02M 7/217; H02M 7/219; H02M 7/48; H02M 7/4826; H02M 7/515; H02M 7/521; H02M 7/5387; B60L 53/20; B60L 53/22; B60L 53/24; B60L 2210/00; B60L 2210/10; B60L 2210/12; B60L 2210/14; B60L 2210/30; B60L 2210/40; B60L 2210/42; B60L 2210/44; H02J 7/02; H02J 7/022; H02J 7/025; H02J 7/04; H02J 7/042; H02J 7/045; H02J 50/10; Y02B 70/10; Y02T 10/70; Y02T 10/7072; Y02T 90/14
  USPC ............ 363/15–21.3, 34, 35, 37, 40–43, 65, 363/67–70; 323/205–211, 268–275, 323/280–285, 351; 320/103, 104, 320/107–115; 307/9.1, 10.1, 82, 104
  See application file for complete search history.

(56) References Cited

U.S. PATENT DOCUMENTS

| | | | |
|---|---|---|---|
| 10,541,549 B2 | 1/2020 | Sato et al. | |
| 2012/0306439 A1* | 12/2012 | Ichikawa | ................ B60L 50/61 320/108 |
| 2014/0139156 A1* | 5/2014 | Hayashi | .................. H02P 21/02 318/400.3 |
| 2014/0340027 A1 | 11/2014 | Keeling et al. | |
| 2016/0308475 A1* | 10/2016 | Morii | .................... H02P 27/085 |
| 2017/0117731 A1 | 4/2017 | Shimada et al. | |
| 2018/0166903 A1 | 6/2018 | Sato et al. | |

FOREIGN PATENT DOCUMENTS

| | | |
|---|---|---|
| JP | 2016-524890 A | 8/2016 |
| JP | 2016-220454 A | 12/2016 |
| JP | 2017-85689 A | 5/2017 |
| WO | 2019/150597 A1 | 8/2019 |

* cited by examiner

Vac2 = LOW
LOSS CHARACTERISTIC INFORMATION OF NON-CONTACT TYPE CHARGER

POWER CONVERSION DEVICE HAVING A CONFIGURATION FOR SIMULTANEOUS WIRED AND WIRELESS CHARGING

CROSS-REFERENCE TO RELATED APPLICATIONS

The present application is based on PCT filing PCT/JP2019/019073, filed May 14, 2019, which claims priority to JP 2018-164114, filed Sep. 3, 2018, the entire contents of each are incorporated herein by reference.

TECHNICAL FIELD

The present disclosure relates to a power conversion device.

BACKGROUND ART

In recent years, from the viewpoint of protecting the global environment, electric vehicles such as plug-in hybrid cars (plug-in hybrid electric vehicles) which run by driving a motor with electric power charged in a battery have been developed. These electric vehicles are equipped with a power supply device as the following power conversion device having a power supply function of supplying power from an external commercial power supply or the like to the battery.

Specifically, the power supply device includes: an isolated AC/DC converter that is connected to an AC power supply and that outputs a link voltage isolated from the AC power supply; a bidirectional DC/DC converter that receives the link voltage and charges a main battery; and an isolated DC/DC converter that receives the link voltage and supplies power to a load. When the voltage of the main battery is equal to or lower than a threshold, control means causes the bidirectional DC/DC converter to perform a switching operation to maintain the link voltage at a link voltage lower limit. When the voltage of the main battery is equal to or higher than the threshold, the control means causes the bidirectional DC/DC converter to perform a through operation to make the link voltage substantially equal to the voltage of the main battery. Accordingly, the control means determines the threshold such that the overall loss in the power supply device is reduced (see, for example, Patent Document 1).

In the power conversion device described above, the isolated AC/DC converter is physically connected to the AC power supply via a connection line such as a charging cable, and the power loss is reduced while the main battery and the load are charged via the charging cable. However, a wired method of performing charging by using a connection line such as a charging cable has a problem that workability is deteriorated when handling the charging cable in outdoor charging work in bad weather, for example. Therefore, for example, a vehicle-side device has been proposed as the following power conversion device that can supply power by selectively using at least either a wireless method (non-contact method) in which power is received in a non-contact manner from a power transmission coil of a power transmission device buried under a road or the above-described wired method (contact method) and that reduces a power loss.

Specifically, the vehicle-side device serves to receive charging power from an infrastructure side via wired connection and/or wireless connection. The vehicle side includes a wired path including a main electromagnetic interference (EMI) filter, a rectifier, and a PFC (Power Factor Correction) unit. The vehicle side further includes a wireless path including a vehicle pad, a vehicle tuning circuit, a vehicle pad decoupling rectifier, and an output filter. The vehicle side further includes a coupling path including a bulk capacitance, an isolated DC/DC converter, and a battery. The PFC unit reduces harmonic components in the current of an AC supply source. Reducing the AC current harmonic components can help energy suppliers reduce excessive power loss in a power grid and substantially sinusoidally maintain a main line voltage. The PFC unit receives a signal from the main EMI filter and provides a power factor improving signal to the bulk capacitance. The output filter receives a signal from the vehicle pad decoupling rectifier and provides a filtered output signal to the bulk capacitance (see, for example, Patent Document 2).

CITATION LIST

Patent Document

Patent Document 1: Japanese Laid-Open Patent Publication No. 2015-208171 (paragraphs [0020] to [0040], FIG. 4 to FIG. 6)

Patent Document 2: Japanese Laid-Open Patent Publication No. 2016-524890 (paragraphs [0136] to [0146] and [0249], FIG. 10)

SUMMARY OF THE INVENTION

Problems to be Solved by the Invention

In the power conversion device as described in Patent Document 2, the battery can be charged from at least either the wired path or the wireless path. However, since the PFC unit is usually a boost circuit, when the voltage of the AC supply source is high, the voltage of the vehicle-mounted bulk capacitance becomes even higher. In this case, if the received voltage on the wireless method side is low, the power supply function on either the wired method side or the wireless path side has to be stopped. Therefore, there is a problem that, for example, even when it is necessary to charge the battery simultaneously from both the wired path and the wireless path in order to shorten the charging time, the battery cannot be charged simultaneously from both paths in some cases, depending on the received voltage values on the wired path side and the wireless path side.

Furthermore, for the power conversion device that performs such power supply, improvement of the power supply efficiency is required from the viewpoints of shortening a power supply time, reducing the number of devices on the power supply device side, etc.

The present disclosure has been made to solve the above problem, and relates to a power conversion device that improves workability by allowing power supply to be performed simultaneously with a power supply function by a wired method and a power supply function by a wireless method regardless of received voltage values on a wired method side and a wireless method side and that can effectively reduce a power loss.

Solution to the Problems

A power conversion device according to the present disclosure is a power conversion device including:
a first power conversion circuit connected at a first end to an AC power supply and having a first converter circuit for converting an input voltage from the AC power supply to a DC voltage, and a second converter circuit for boosting or stepping down the DC voltage resulting from the conversion by the first converter circuit and outputting the DC voltage through a second end;

a second power conversion circuit having a non-contact power receiving coil as a first end for receiving power in a non-contact manner by magnetically coupling with a power transmission coil of a power transmission device, and a third converter circuit for converting an AC voltage received from the non-contact power receiving coil to a DC voltage and outputting the DC voltage through a second end;

a third power conversion circuit connected at a second end to a load, the third power conversion circuit being for boosting or stepping down a DC voltage inputted through a first end and performing power supply to the load;

a first DC capacitor and a second DC capacitor each for smoothing a DC voltage; and a control circuit for controlling the first power conversion circuit, the second power conversion circuit, and the third power conversion circuit, wherein the second end of the first power conversion circuit and the second end of the second power conversion circuit are connected to the first end of the third power conversion circuit via an integrated bus, the first DC capacitor is connected between the first converter circuit and the second converter circuit, and the second DC capacitor is connected to the integrated bus, thereby allowing DC power outputted from at least either the first power conversion circuit or the second power conversion circuit to be supplied to the load via the third power conversion circuit, and the control circuit adjusts a DC voltage of the first DC capacitor or a DC voltage of the second DC capacitor such that a power loss of at least one of the first power conversion circuit, the second power conversion circuit, and the third power conversion circuit is reduced.

Effect of the Invention

In the power conversion device according to the present disclosure, regardless of received voltage values on a wired method side and a wireless method side, it is possible to simultaneously perform power supply with a power supply function by a wired method and a power supply function by a wireless method, thereby improving workability, and it is also possible to effectively reduce a power loss.

DESCRIPTION OF EMBODIMENTS

Embodiment 1

Hereinafter, a power conversion device according to Embodiment 1 of the present disclosure will be described with reference to the drawings.

Figure 1:
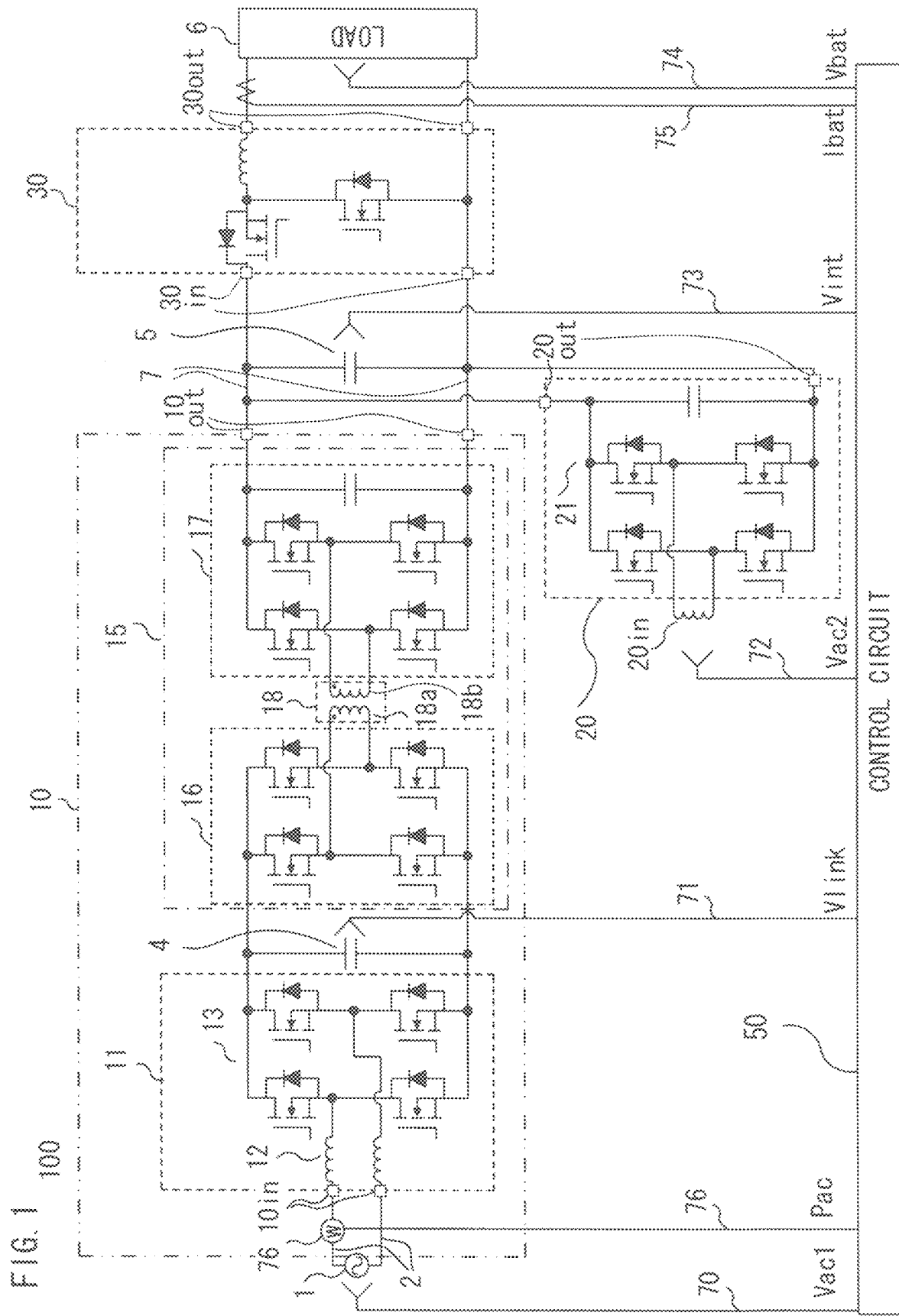
FIG. 1 is a schematic configuration diagram showing a power conversion device according to Embodiment 1.

FIG. 1 is a schematic configuration diagram showing a power conversion device 100 according to Embodiment 1.

The power conversion device 100 according to the present embodiment is a power supply system applied to a charger that is mounted inside an electric vehicle or the like. The power conversion device 100 supplies power from a commercial AC system outside the electric vehicle, a private power generator, or the like to a load 6 such as a high-voltage battery inside the electric vehicle.

The power conversion device 100 includes a contact type charger 10 as a first power conversion circuit, a non-contact type charger 20 as a second power conversion circuit, a DC/DC converter 30 as a third power conversion circuit, and a control circuit 50.

The contact type charger 10 receives power from an AC power supply 1 such as a commercial AC system or a private power generator when being physically connected to the AC power supply 1 by a connection line such as a charging cable 2.

The non-contact type charger 20 receives power in a non-contact manner from an external power transmission device that is not shown.

The DC/DC converter 30 supplies the power received from the contact type charger 10 and the non-contact type charger 20, to the load 6.

The control circuit 50 controls the contact type charger 10, the non-contact type charger 20, and the DC/DC converter 30.

An output terminal 10out of the contact type charger 10 and an output terminal 20out of the non-contact type charger 20 are connected to an input terminal 30in of the DC/DC converter 30 via an integrated bus 7. An integrated capacitor 5 as a second DC capacitor is connected to the integrated bus 7, and smooths DC voltages outputted from the contact type charger 10 and the non-contact type charger 20. The voltage applied to the integrated bus 7 is referred to as a DC voltage Vint.

In the following description, the contact type charger 10, the non-contact type charger 20, and the DC/DC converter 30 are referred to simply as power conversion circuits when these components do not need to be distinguished from each other.

First, the detailed configuration of the contact type charger 10 will be described.

The contact type charger 10 includes an AC/DC converter 11 as a first converter circuit, and an isolated DC/DC converter 15 as a second converter circuit.

The contact type charger 10 is connected at an input terminal 10in as a first end to the AC power supply 1 via the charging cable 2, and is connected at the output terminal 10out as a second end to the integrated capacitor 5 via the integrated bus 7. The contact type charger 10 converts an AC voltage Vac1 from the AC power supply 1 to the DC voltage Vint and outputs the DC voltage Vint to the integrated capacitor 5.

The connection point between the AC/DC converter 11 and the isolated DC/DC converter 15 is defined as a DC link, and the DC voltage applied to the DC link is referred to as a DC voltage Vlink.

The AC/DC converter 11 is a boost type converter that includes: a reactor 12 connected to the input terminal 10in; and a full-bridge converter 13. The AC/DC converter 11 receives the AC voltage Vac1 from the AC power supply 1 and outputs the DC voltage Vlink.

The contact type charger 10 includes a DC link capacitor 4 as a first DC capacitor connected to the DC link, and the DC link capacitor 4 smooths the DC voltage Vlink.

The isolated DC/DC converter 15 is a converter that includes an inverter 16 as an inverter circuit, an isolation transformer 18, and a converter 17 as a fourth converter circuit and that serves as both a boost type and a step-down type.

The inverter 16 receives the DC voltage Vlink and outputs an AC voltage to a first winding 18a of the isolation transformer 18. The isolation transformer 18 multiplies the AC voltage applied to the first winding 18a by a winding number ratio, and outputs the AC voltage to a second winding 18b on a secondary side. The converter 17 receives the AC voltage outputted to the second winding 18b of the isolation transformer 18, and outputs the DC voltage Vint to the integrated capacitor 5.

Next, the detailed configuration of the non-contact type charger 20 will be described.

The non-contact type charger 20 includes a non-contact power receiving coil 20in as a first end, and a full-bridge converter 21 as a third converter circuit. The non-contact power receiving coil 20in is magnetically coupled to a power transmission coil of an external power transmission device, which is not shown, by magnetic force, and receives power from this power transmission coil in a non-contact manner. In addition, the non-contact type charger 20 is connected at the output terminal 20out as a second end to the integrated capacitor 5 via the integrated bus 7.

Thus, the non-contact type charger 20 receives the power transmitted from the external power transmission device, rectifies the power with the full-bridge converter 21, and outputs the DC voltage Vint to the integrated capacitor 5.

Next, the detailed configuration of the DC/DC converter 30 will be described.

The DC/DC converter 30 is a step-down type converter that performs step-down conversion in the direction from the integrated capacitor 5 to the load 6. The DC/DC converter 30 is connected at the input terminal 30in as a first end to the integrated capacitor 5 via the integrated bus 7, and is connected at an output terminal 30out as a second end to the load 6. Thus, the DC/DC converter 30 receives the DC voltage Vint of the integrated capacitor 5 and outputs a DC voltage Vbat to the load 6.

As described above, the power conversion device 100 is a device in which a contact type power supply function by a wired method (contact method) in which the power conversion device 100 is physically connected to the AC power supply 1 by the charging cable 2, and a non-contact power supply function by a wireless method (non-contact method) in which the power conversion device 100 is connected to an external power transmission device in a non-contact manner, are integrated.

The control circuit 50 can perform both-method power supply in which charging is performed by using both the wired method and the wireless method, or single-method power supply in which charging is performed by using either the wired method or the wireless method.

The power conversion device 100 further includes: a voltage detector 70 that detects the AC voltage Vac1 of the AC power supply 1; a voltage detector 71 that detects the DC voltage Vlink of the DC link capacitor 4; a voltage detector 72 that detects an AC voltage Vac2 of the non-contact power receiving coil 20in; a voltage detector 73 that detects the DC voltage Vint of the integrated capacitor 5; a voltage detector 74 that detects the DC voltage Vbat of the load 6; a current detector 75 that detects a DC current Ibat to be outputted to the load 6; and a power detector 76 that detects AC power Pac from the AC power supply 1.

Next, the operation mode of the power conversion device 100 configured as described above will be described.

The power conversion device 100 of the present embodiment makes a selection from two charging operation modes and charges the load 6 which is a high-voltage battery for vehicle travelling. The first one is a CC (Constant Current) mode of constant current charging for the load 6. The second one is a CP (Constant Power) mode of constant power charging for the load 6.

In the operation mode, the control circuit 50 uses detection values obtained by the voltage detectors 70 to 74, the current detector 75, and the power detector 76 described above.

First, the CC mode, which is the first charging operation mode, will be described.

In the CC mode, the DC/DC converter 30 controls the DC current Ibat to be outputted to the load 6.

The method for controlling the DC/DC converter 30 by the control circuit 50 is known feedback control. The control circuit 50 determines an ON time DUTY_CHOP of switching elements of the DC/DC converter 30 on the basis of an error Ibat_err between an arbitrary DC current command value Ibat_ref and a detection value of the DC current Ibat.

For example, the control circuit 50 amplifies the error Ibat_err with a compensator such as a proportional integrator and calculates the ON time DUTY_CHOP. Through the feedback control, the DC/DC converter 30 receives an arbitrary DC voltage Vint of the integrated capacitor 5 as an input voltage, and controls the DC current Ibat to a desired DC current command value Ibat_ref.

In the CC mode, the isolated DC/DC converter 15 controls the DC voltage Vint of the integrated capacitor 5.

The method for controlling the isolated DC/DC converter 15 by the control circuit 50 is known feedback control. The control circuit 50 determines a time DUTY_DAB for which a voltage is applied to the isolation transformer 18, on the basis of an error Vint_err between an arbitrary DC voltage command value Vint_ref and a detection value of the DC voltage Vint.

For example, the control circuit 50 amplifies the error Vint_err with a compensator such as a proportional integrator and calculates the time DUTY_DAB for which a voltage is applied to the isolation transformer 18. Through the feedback control, the isolated DC/DC converter 15 receives an arbitrary DC voltage Vlink as an input voltage and controls the DC voltage Vint to a desired DC voltage command value Vint_ref.

In the CC mode, the AC/DC converter 11 controls the DC voltage Vlink to be outputted to the isolated DC/DC converter 15 side.

The method for controlling the AC/DC converter 11 by the control circuit 50 is known feedback control. The control circuit 50 determines an On time DUTY_PFC of switching elements of the AC/DC converter 11 on the basis of an error Vlink_err between an arbitrary DC voltage command value Vlink_ref and a detection value of the DC voltage Vlink.

For example, the control circuit 50 amplifies the error Vlink_err with a compensator such as a proportional integrator and calculates the On time DUTY_PFC. Through the feedback control, the AC/DC converter 11 receives an arbitrary AC voltage Vac1 of the AC power supply 1 as an input voltage and controls the DC voltage Vlink to a desired DC voltage command value Vlink_ref.

In the CC mode, the non-contact type charger 20 receives transmission energy transmitted from a power-transmission side coil, which is not shown, and outputs DC power Pw to the integrated capacitor 5 so as to be regarded as a power source. The same also applies to the CP mode described later.

In this manner, the power conversion device 100 performs constant current charging of the load 6 by the above-described operation regarding the CC mode.

Next, the CP mode, which is the second charging operation mode, will be described.

In the CP mode, the DC/DC converter 30 controls the DC voltage Vint of the integrated capacitor 5.

The method for controlling the DC/DC converter 30 by the control circuit 50 is known feedback control. The control circuit 50 determines an ON time DUTY_CHOP of the switching elements of the DC/DC converter 30 on the basis of an error Vint_err between an arbitrary DC voltage command value Vint_ref and a detection value of the DC voltage Vint.

For example, the control circuit 50 amplifies the error Vint_err with a compensator such as a proportional integrator and calculates the ON time DUTY_CHOP. Through the feedback control, even for arbitrary output power Pbat to the load 6, the DC/DC converter 30 controls the DC voltage Vint to a desired DC voltage command value Vint_ref.

In the CP mode, the isolated DC/DC converter 15 controls the DC voltage Vlink of the connection point between the AC/DC converter 11 and the isolated DC/DC converter 15.

The method for controlling the isolated DC/DC converter 15 by the control circuit 50 is known feedback control. The control circuit 50 determines a time DUTY_DAB for which a voltage is applied to the isolation transformer 18, on the basis of an error Vlink_err between an arbitrary DC voltage command value Vlink_ref and a detection value of the DC voltage Vlink.

For example, the control circuit 50 amplifies the error Vlink_err with a compensator such as a proportional integrator and calculates the time DUTY_DAB for which a voltage is applied to the isolation transformer 18. Through the feedback control, the isolated DC/DC converter 15 outputs an arbitrary DC voltage Vint of the integrated capacitor 5 as an output voltage and controls the DC voltage Vlink, which is an input voltage, to a desired DC voltage command value Vlink_ref.

In the CP mode, the AC/DC converter 11 controls the AC power Pac inputted thereto from the AC power supply 1.

The method for controlling the AC/DC converter 11 by the control circuit 50 is known feedback control. The control circuit 50 determines an On time DUTY_PFC of the switching elements of the AC/DC converter 11 on the basis of an error Pac_err between an arbitrary AC power command value Pac_ref and a detection value of the AC power Pac.

For example, the control circuit 50 amplifies the error Pac_err with a compensator such as a proportional integrator and calculates the On time DUTY_PFC. Through the feedback control, the AC/DC converter 11 outputs an arbitrary DC voltage Vlink as an output voltage and controls the AC power Pac to a desired AC power command value Pac_ref.

In the CP mode, the non-contact type charger 20 receives the transmission energy transmitted from the power-transmission side coil, which is not shown, and outputs DC power Pw to the integrated capacitor 5 so as to be regarded as a power source. This is the same as in the CC mode described above.

In this manner, the power conversion device 100 charges the load 6 with the total power of the DC power outputted by the contact type charger 10 and the DC power Pw outputted by the non-contact type charger 20 as the maximum power through the above-described operation regarding the CP mode.

When performing the above-described constant current charging CC mode and constant power charging CP mode, the control circuit 50 of the power conversion device 100 performs control so as to reduce a power loss that occurs in the power conversion device 100.

Hereinafter, an operation, for reduction of power loss, by the control circuit 50 will be described.

As parameters representing operating conditions, the power conversion device 100 has the AC voltage Vac1 of the AC power supply 1, the DC voltage Vlink of the connection point between the AC/DC converter 11 and the isolated DC/DC converter 15, the DC voltage Vint of the integrated capacitor 5, the DC voltage Vbat of the load 6, and the AC voltage Vac2 of the non-contact power receiving coil 20in.

Since the AC voltage Vac1 and the AC voltage Vac2 are determined by the state of the AC system side, and the DC voltage Vbat is determined by the type, the amount of charge, etc., of the high-voltage battery, it is difficult for the control circuit 50 to arbitrarily adjust the AC voltages Vac1 and Vac2 and the DC voltage Vbat.

Since the DC voltage Vlink of the DC link capacitor 4 is determined by the AC voltage Vac1 and the boost ratio of the AC/DC converter 11, it is possible to adjust the DC voltage Vlink only in a range of equal to or higher than the AC voltage Vac1. In addition, since the DC voltage Vint of the integrated capacitor 5 is determined by the DC voltage Vbat of the load 6 and the step-down ratio of the DC/DC converter 30, it is possible to adjust the DC voltage Vint only in a range of equal to or higher than the DC voltage Vbat.

Power losses that occur in the power conversion circuits such as the AC/DC converter 11, the isolated DC/DC converter 15, and the DC/DC converter 30 may change depending on the input voltages and the output voltages. Thus, in the circuit configuration of the power conversion device 100 of the present embodiment, the input voltages or the output voltages of the AC/DC converter 11, the isolated DC/DC converter 15, and the DC/DC converter 30 are changed by adjusting the DC voltage Vlink or the DC voltage Vint. Accordingly, it is possible to adjust the power loss in the power conversion device 100. Therefore, in the present embodiment, adjustment of the DC voltage command value Vlink_ref or the DC voltage command value Vint_ref is performed as control of the control circuit 50 for power loss reduction of the power conversion device 100.

In the control for power loss reduction, the control circuit 50 has: a first mode in which the control circuit 50 detects power losses Ps of the power conversion circuits 10, 20, and 30, and performs power loss reduction on the basis of the detected power losses Ps; a second mode in which the control circuit 50 detects the DC current Ibat, which is an output current outputted from the DC/DC converter 30 to the load 6, and performs power loss reduction on the basis of the detected DC current Ibat; and a third mode in which the control circuit 50 performs power loss reduction using loss characteristic information J in which power losses of the power conversion circuits 10, 20, and 30 are recorded in advance.

In the present embodiment, control using the first mode by the control circuit 50 will be described.

Figure 2:
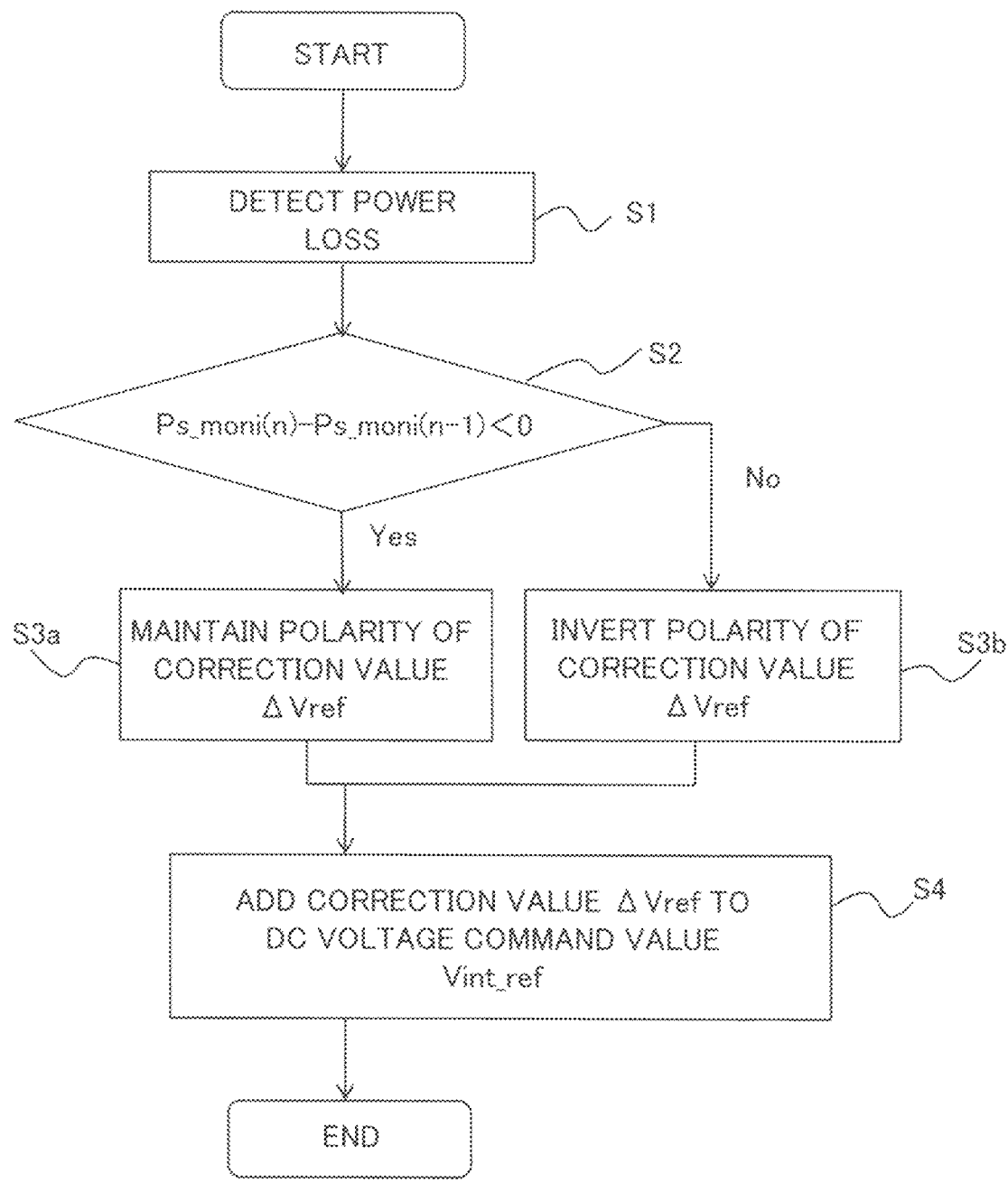
FIG. 2 is a flowchart showing a first mode which is an operation mode, for power loss reduction, of a control device according to Embodiment 1.

FIG. 2 is a flowchart showing processes performed in the first mode which is an operation mode, for power loss reduction, of the control circuit 50 according to Embodiment 1.

As described above, in the control for power loss reduction of the power conversion device 100, adjustment of the DC voltage command value Vlink or the DC voltage command value Vint is conceivable. However, in the following, control for adjusting the DC voltage Vint will be described.

In addition, as described in detail below, the control circuit 50 has a function of calculating the power loss Ps, a function of recording the power loss Ps for at least two times, and a function of adding a set correction value ΔVref to the DC voltage command value Vint_ref.

When the control circuit 50 starts control by the first mode for power loss reduction, the control circuit 50 repeatedly performs the processes from "start" to "end" shown in FIG. 2. The repeating condition is elapse of a preset first set time t1 by time measurement. That is, during execution of the first mode, the control circuit 50 performs the series of processes from "start" to "end" every first set time t1.

During operation of the power conversion device 100, the control circuit 50 detects a power loss Ps of the power conversion device 100 (step S1).

In step S1, the control circuit 50 detects and records the total power loss Ps of the contact type charger 10, the non-contact type charger 20, and the DC/DC converter 30. Then, the control circuit 50 records a detection result Ps_moni of the latest power loss Ps as Ps_moni (n), and records a detection result Ps_moni of the power loss Ps detected the first set time t1 before, as Ps_moni (n−1).

As for the method for detecting the power loss Ps, for example, a power detector (not shown) is provided on the input side of the non-contact type charger 20. In the CP mode, the control circuit 50 may calculate the power loss Ps by comparing the total input power of the AC power command value Pac_ref of the AC power Pac inputted to the contact type charger 10 and the AC power that is to be inputted to the non-contact type charger 20 and that is detected by the power detector, which is not shown, with the output power obtained from the detected DC voltage Vbat of the load 6 and the detected DC current Ibat to the load 6.

Moreover, for example, in the CC mode, the control circuit 50 may calculate the power loss Ps by comparing the total input power with the output power obtained from the DC current command value Ibat_ref to the load 6 and the detected DC voltage Vbat of the load 6.

Furthermore, for example, a power detector is provided on the output side of the DC/DC converter 30. The control circuit 50 may calculate the power loss Ps by comparing the total input power of the input power detected by the power detector 76 on the input side of the contact type charger 10 and the input power detected by the power detector that is provided on the input side of the non-contact type charger 20 and that is not shown, with the output power detected by the power detector provided on the output side of the DC/DC converter 30.

Next, the control circuit 50 calculates a power loss change that is a temporal change of the power loss Ps_moni detected as described above. That is, the control circuit 50 compares the Ps_moni (n) with the Ps_moni (n−1) and determines whether the Ps_moni (n) has increased or decreased from the Ps_moni (n−1), that is, whether the Ps_moni tends to increase or decrease (step S2).

When the latest power loss Ps_moni (n) detected this time is smaller than the power loss Ps_moni (n−1) detected last time (step S2: Yes), the control circuit 50 maintains the preset polarity of the correction value ΔVref (step S3a), adds the correction value ΔVref having the preset polarity to the DC voltage command value Vint_ref of the integrated capacitor 5 (step S4), and ends the process.

On the other hand, when the latest power loss Ps_moni (n) detected this time is equal to or larger than the power loss Ps_moni (n−1) detected last time (step S2: No), the control circuit 50 multiplies the preset correction value ΔVref by −1 to invert the polarity of the correction value ΔVref (step S3b), adds the correction value ΔVref having the polarity obtained by inverting the preset polarity, to the DC voltage command value Vint_ref of the integrated capacitor 5 (step S4), and ends the process.

Then, the control circuit 50 performs the series of processes from "start" to "end" again. Then, when the latest power loss Ps_moni (n) is smaller than the power loss Ps_moni (n−1) in step S2 (step S2: Yes), the control circuit 50 maintains the polarity of the correction value ΔVref set in the previous series of processes (step S3a), and adds the correction value ΔVref having the polarity set last time, to the DC voltage command value Vint_ref of the integrated capacitor 5 (step S4).

On the other hand, when the latest power loss Ps_moni (n) is equal to or larger than the power loss Ps_moni (n−1) (step S2: No), the control circuit 50 inverts the polarity of the correction value ΔVref set in the previous series of processes (step S3b), and adds the correction value ΔVref having the polarity obtained by inverting the polarity set last time, to the DC voltage command value Vint_ref of the integrated capacitor 5 (step S4).

As described above, in the first mode, the control circuit 50 detects the power loss Ps every first set time t1, maintains the previous polarity of the correction value ΔVref (the preset polarity at the time of initial calculation) when the power loss Ps has decreased, inverts the previous polarity of the correction value ΔVref (the preset polarity at the time of initial calculation) when the power loss Ps has increased, and adds the correction value ΔVref to the DC voltage command value Vint_ref, thereby obtaining a new DC voltage command value Vint_ref.

By repeating this control, the value of the DC voltage Vint of the integrated capacitor 5 is controlled such that the power loss Ps is minimized.

In the case of the CC mode, as described above, the time DUTY_DAB for which a voltage is applied to the isolation transformer 18 included in the isolated DC/DC converter 15 is determined on the basis of the error Vint_err between an arbitrary DC voltage command value Vint_ref and the detection value of the DC voltage Vint. Then, the DC voltage Vint of the integrated capacitor 5 is controlled by the isolated DC/DC converter 15.

In the case of the CP mode, as described above, the ON time DUTY_CHOP of the switching elements of the DC/DC converter 30 is determined on the basis of the error Vint_err between an arbitrary DC voltage command value Vint_ref and the detection value of the DC voltage Vint. Then, the DC voltage Vint of the integrated capacitor 5 is controlled by the DC/DC converter 30.

Accordingly, the isolated DC/DC converter 15 or the DC/DC converter 30 is controlled such that the DC voltage Vint follows the DC voltage command value Vint_ref corrected by the control circuit 50. As a result, the DC voltage Vint is controlled such that the power loss of the power conversion device 100 is reduced.

Although the example in which the DC voltage Vint of the integrated capacitor 5 is adjusted has been described above, control similar to the above can also be performed on the DC voltage Vlink of the DC link capacitor 4.

In the case of adjusting the DC voltage Vlink of the DC link capacitor 4, in step S4, the correction value ΔVref is added to the DC voltage command value Vlink_ref for the DC link capacitor 4.

Then, in the case of the CC mode, as described above, the On time DUTY_PFC of the switching elements of the AC/DC converter 11 is determined on the basis of the error Vlink_err between an arbitrary DC voltage command value Vlink_ref and the detection value of the DC voltage Vlink.

Then, the DC voltage Vlink of the DC link capacitor 4 is controlled by the AC/DC converter 11.

In the case of the CP mode, as described above, the time DUTY_DAB for which a voltage is applied to the isolation transformer 18 of the isolated DC/DC converter 15 is determined on the basis of the error Vlink_err between an arbitrary DC voltage command value Vlink_ref and the detection value of the DC voltage Vlink. Then, the DC voltage Vlink of the DC link capacitor 4 is controlled by the isolated DC/DC converter 15.

In the above, in step S1, the control circuit 50 detects the total power loss Ps of the three power conversion circuits including the contact type charger 10, the non-contact type charger 20, and the DC/DC converter 30, that is, the power loss Ps in the entire power conversion device 100. Then, the control circuit 50 adjusts the DC voltage Vlink or the DC voltage Vint such that the power loss Ps in the entire power conversion device 100 is reduced.

In the case of simultaneously operating the contact type charger 10 and the non-contact type charger 20, a possibility that the loss of the non-contact type charger 20 will extremely increase when the DC voltage command value Vint_ref with which the loss is minimized in the contact type charger 10 is selected, is assumed. In such a case, the power loss can be effectively reduced by selecting the DC voltage command value Vint_ref that decreases the total loss of the contact type charger 10, the non-contact type charger 20, and the DC/DC converter 30 as described above.

When the influence of the power loss of the DC/DC converter 30 is small, in step S1, the control circuit 50 may detect the total power loss Ps of two power conversion circuits that are the contact type charger 10 and the non-contact type charger 20, and adjust the DC voltage Vlink or the DC voltage Vint such that the power loss Ps of the two power conversion circuits that are the contact type charger 10 and the non-contact type charger 20 is reduced.

For example, in the case of performing power supply operation in which the contact type charger 10 is operated and the non-contact type charger 20 is not operated, the power loss Ps of only the contact type charger 10 may be detected. In this case, the control circuit 50 adjusts the DC voltage Vlink or the DC voltage Vint such that the power loss Ps of the contact type charger 10 is reduced.

For example, the control circuit 50 may detect the power loss Ps of the contact type charger 10 and the power loss Ps of the DC/DC converter 30 and adjust the DC voltage Vlink or the DC voltage Vint such that the power losses Ps of the contact type charger 10 and the DC/DC converter 30 are reduced.

For example, in the case of performing power supply operation in which the non-contact type charger 20 is operated and the contact type charger 10 is not operated, the power loss Ps of only the non-contact type charger 20 may be detected. In this case, the control circuit 50 adjusts the DC voltage Vlink or the DC voltage Vint such that the power loss Ps of the non-contact type charger 20 is reduced.

For example, the control circuit 50 may detect the power loss Ps of the non-contact type charger 20 and the power loss Ps of the DC/DC converter 30 and adjust the DC voltage Vlink or the DC voltage Vint such that the power losses Ps of the non-contact type charger 20 and the DC/DC converter 30 are reduced.

For example, when the power loss due to the DC/DC converter 30 is dominant in the power loss in the entire power conversion device 100, only the power loss Ps of the DC/DC converter 30 may be detected, and the DC voltage Vlink or the DC voltage Vint may be adjusted such that the power loss Ps of the DC/DC converter 30 is reduced.

In other words, the control circuit 50 adjusts the DC voltage Vlink or the DC voltage Vint such that the power loss Ps of at least one power conversion circuit among the respective power conversion circuits including the contact type charger 10, the non-contact type charger 20, and the DC/DC converter 30 is reduced.

In the power conversion device 100 of the present embodiment configured as described above, the output terminal 10out of the contact type charger 10 and the output terminal 20out of the non-contact type charger 20 are connected to the input terminal 30in of the DC/DC converter 30 via the integrated bus 7, and the integrated capacitor 5 is connected to the integrated bus 7. Thus, the non-contact type charger 20 is configured to be connected to the output side of the isolated DC/DC converter 15 of the contact type charger 10. Accordingly, it is possible to simultaneously perform power supply with the power supply function by the wired method and the power supply function by the wireless method, regardless of the voltage values of the AC voltage Vac1 on the wired method side and the AC voltage Vac2 on the wireless method side, so that workability is improved.

Furthermore, in the power conversion device 100 having such a circuit configuration, the control circuit 50 detects an increase/decrease in the power losses Ps of the contact type charger 10, the non-contact type charger 20, and the DC/DC converter 30, and controls the DC voltage Vlink of the DC link capacitor 4 or the DC voltage Vint of the integrated capacitor 5 such that the power losses Ps are reduced. The power loss is effectively reduced by adjusting the input voltages or the output voltages of the AC/DC converter 11, the isolated DC/DC converter 15, the DC/DC converter 30, and the full-bridge converter 21 in the contact type charger 10 as described above.

For the power losses Ps of the contact type charger 10, the non-contact type charger 20, and the DC/DC converter 30, the control circuit 50 also determines whether the power loss Ps detected every first set time t1 tends to increase or decrease, and controls the DC voltage Vlink or the DC voltage Vint on the basis of this determination.

By detecting the actual power loss Ps periodically every first set time t1 as described above, it is possible to accurately adjust the DC voltage Vlink or the DC voltage Vint in accordance with the actual loss state of the power conversion device 100. Accordingly, the power loss is further effectively reduced.

In the case of adjusting the DC voltage Vint of the integrated capacitor 5, the control circuit 50 controls the switching elements of the isolated DC/DC converter 15 in the CC mode, and controls the switching elements of the DC/DC converter 30 in the CP mode.

Also, in the case of adjusting the DC voltage Vlink of the DC link capacitor 4, the control circuit 50 controls the switching elements of the AC/DC converter 11 in the CC mode, and controls the switching elements of the isolated DC/DC converter 15 in the CP mode.

As described above, in the adjustment of the DC voltage Vlink of the DC link capacitor 4 or the DC voltage Vint of the integrated capacitor 5, it is possible to perform control by using the two modes. Here, the load 6 is a battery, and it is possible to handle the case where the CC mode is needed near full charge and the case where the CP mode is needed such that the supplied power becomes the maximum power instead of near full charge.

Although the step-down circuit is shown as the DC/DC converter 30, the DC/DC converter 30 may be a boost circuit.

Embodiment 2

Hereinafter, Embodiment 2 of the present disclosure will be described, focusing on the differences from Embodiment 1 described above, with reference to the drawing. The same parts as those in Embodiment 1 described above are designated by the same reference characters, and the description thereof is omitted.

In Embodiment 1, the first mode, in which the power losses Ps of the power conversion circuits 10, 20, and 30 are detected and the power loss reduction is performed on the basis of the detected power losses Ps, has been described.

In the present embodiment, the second mode, in which the DC current Ibat, which is the output current outputted from the DC/DC converter 30 to the load 6, is detected and power loss reduction is performed on the basis of the detected DC current Ibat, will be described.

Figure 3:
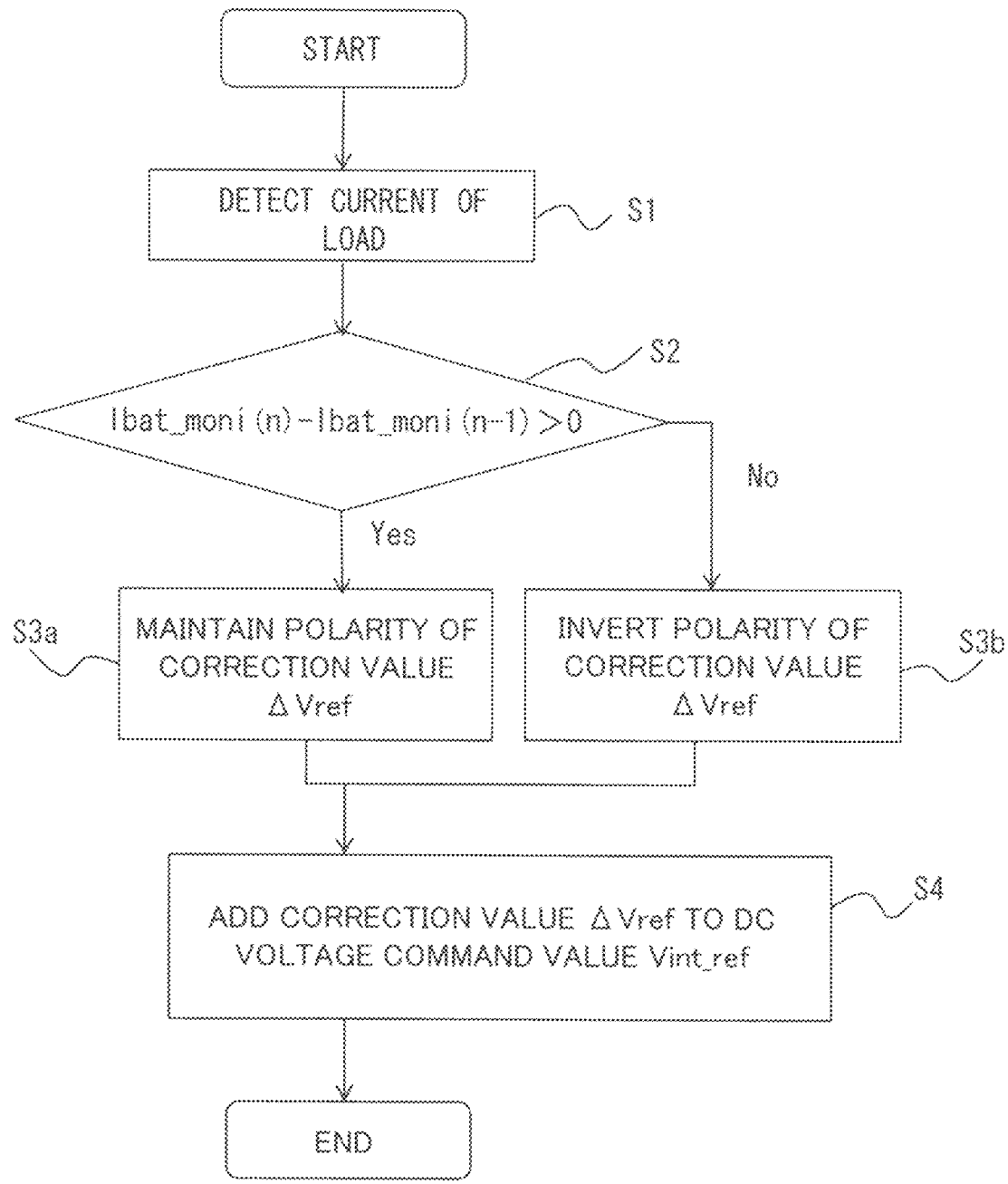
FIG. 3 is a flowchart showing a second mode which is an operation mode, for power loss reduction, of a control device according to Embodiment 2.

FIG. 3 is a flowchart showing processes performed in the second mode which is an operation mode, for power loss reduction, of the control circuit 50 according to the present Embodiment 2. The following description will be given with an example in which the DC voltage Vint of the integrated capacitor 5 is adjusted.

The control circuit 50 has a function of detecting the DC current Ibat, a function of recording the DC current Ibat for at least two times, and a function of adding the set correction value ΔVref to the DC voltage command value Vint_ref.

When the control circuit 50 starts control by the second mode for power loss reduction, the control circuit 50 performs a series of processes from "start" to "end" shown in FIG. 3 every second set time t2 during execution of the second mode, similar to the processes shown in FIG. 2 of Embodiment 1.

The time length set for the second set time t2 in the second mode may be the same as the time length set for the first set time t2 in the first mode.

As shown in FIG. 3, during operation of the power conversion device 100, the control circuit 50 detects the DC current Ibat to be outputted from the DC/DC converter 30 to the load 6 (step S1).

In step S1, the control circuit 50 detects and records the DC current Ibat. Then, the control circuit 50 records a detection result Ibat_moni of the latest DC current Ibat as Ibat_moni (n), and records a detection result Ibat_moni of the DC current Ibat detected the second set time t2 before, as Ibat_moni (n−1).

Next, the control circuit 50 calculates a DC current change that is a temporal change of the calculated DC current Ibat. That is, the control circuit 50 compares the Ibat_moni (n) with the Ibat_moni (n−1) and determines whether the Ibat_moni (n) has increased or decreased from the Ibat_moni (n−1), that is, whether Ibat_moni tends to increase or decrease (step S2).

When the detected latest DC current Ibat_moni (n) is equal to or larger than the DC current Ibat_moni (n−1) detected last time (step S2: Yes), the control circuit 50 maintains the preset polarity of the correction value ΔVref (step S3a), adds the correction value ΔVref having the preset polarity to the DC voltage command value Vint_ref of the integrated capacitor 5 (step S4), and ends the process.

On the other hand, when the detected latest DC current Ibat_moni (n) is less than the DC current Ibat_moni (n−1) detected last time (step S2: No), the control circuit 50 multiplies the preset correction value ΔVref by −1 to invert the polarity of the correction value ΔVref (step S3b), adds the correction value ΔVref having the polarity obtained by inverting the preset polarity, to the DC voltage command value Vint_ref of the integrated capacitor 5 (step S4), and ends the process.

Then, the control circuit 50 performs the series of processes from "start" to "end" again. Then, when the detected latest DC current Ibat_moni (n) is equal to or larger than the detected DC current Ibat_moni (n−1) in step S2 (step S2: Yes), the control circuit 50 maintains the polarity of the correction value ΔVref set in the previous series of processes (step S3a), and adds the correction value ΔVref having the polarity set last time, to the DC voltage command value Vint_ref of the integrated capacitor 5 (step S4).

On the other hand, when the detected latest DC current Ibat_moni (n) is less than the detected DC current Ibat_moni (n−1) (step S2: No), the control circuit 50 inverts the polarity of the correction value ΔVref set in the previous series of processes (step S3b), and adds the correction value ΔVref having the polarity obtained by inverting the polarity set last time, to the DC voltage command value Vint_ref of the integrated capacitor 5 (step S4).

As described above, in the second mode, the control circuit 50 detects the DC current Ibat every second set time t2, maintains the previous polarity of the correction value ΔVref (the preset polarity at the time of initial calculation) when the DC current Ibat has increased, inverts the previous polarity of the correction value ΔVref (the preset polarity at the time of initial calculation) when the DC current Ibat has decreased, and adds the correction value ΔVref to the DC voltage command value Vint_ref, thereby obtaining a new DC voltage command value Vint_ref.

The load 6 is a voltage source such as a high-voltage battery that is capable of supplying power to each device in the electric vehicle. Thus, the load 6 maintains a substantially constant voltage regardless of the DC current Ibat, so that it is possible to perform control in which the value of the DC voltage Vint of the integrated capacitor 5 is maintained such that the DC current Ibat to the load 6 is maximized as described above. Accordingly, the power loss in the entire power conversion device 100 can be minimized.

In the case of the CC mode, as described above, the DC/DC converter 30 controls the DC current Ibat to be outputted to the load 6. The control circuit 50 determines the ON time DUTY_CHOP of the switching elements of the DC/DC converter 30 on the basis of the error Ibat_err between an arbitrary DC current command value Ibat_ref and the detection value of the DC current Ibat. Therefore, even when the function of adding the correction value ΔVref to the above DC voltage command value Vint_ref is executed, the ON time DUTY_CHOP of the DC/DC converter 30 is adjusted such that the DC current Ibat follows the DC current command value Ibat_ref. Thus, a change in the DC current Ibat cannot be extracted. Therefore, in the present embodiment, the CC mode is not applicable, and adjustment of the DC voltage command value Vint_ref with the detection value of the DC current Ibat in the CC mode is not executable.

Meanwhile, in the case of the CP mode, as described above, the DC/DC converter 30 connected to the load 6 controls the DC voltage Vint of the integrated capacitor 5. The DC current Ibat of the load 6 is not controlled to the DC current command value Ibat_ref. Thus, adjustment of the DC voltage command value Vint_ref with the detection value of the DC current Ibat, which is described in the present embodiment, is applicable. As already described, the transmission power to the load 6 in the CP mode is determined by the transmission energy transmitted from the power-transmission side coil, which is not shown, to the non-contact type charger 20, and by the AC power Pac inputted from the AC power supply 1 to the AC/DC converter 11.

Although the load 6 is a voltage source and maintains a substantially constant voltage as described above, particularly when the load 6 is charged with constant power in the CP mode for a long time range, the DC current Ibat decreases if the DC voltage Vbat rises. Therefore, in the present embodiment, the second set time t2, which is the interval at which the control circuit 50 detects the DC current Ibat, is set to a short time range that does not depend on a change in the DC current Ibat due to the state of charge of the load 6. For example, the second set time t2 may be set in accordance with the switching interval of the switching elements of the DC/DC converter 30 driven at high frequency. Furthermore, specifically, the second set time t2 may be an integral multiple of the switching interval of the switching elements. In this case, a second set time t2 corresponding to the switching interval of the switching elements driven at high frequency can be obtained, so that it is possible to detect the DC current Ibat in a short time range.

The power conversion device 100 of the present embodiment configured as described above provides the same effects as Embodiment 1, and can simultaneously perform power supply with the power supply function by the wired method and the power supply function by the wireless method, regardless of the values of the received voltages on the wired method side and the wireless method side.

Furthermore, the control circuit 50 controls the DC voltage Vlink or the DC voltage Vint such that the DC current Ibat, which is the detected output current from the DC/DC converter 30, is maximized. Since the respective power conversion circuits 10, 20, and 30 are controlled such that the DC current Ibat is maximized as described above, that is, the output power is maximized, it is possible to minimize the power loss Ps in the entire power conversion device 100.

The control circuit 50 detects the DC current Ibat every second set time t2, determines whether the detected DC current Ibat tends to increase or decrease, and controls the DC voltage Vlink or the DC voltage Vint on the basis of this determination.

By detecting the actual DC current Ibat periodically every second set time t2 as described above, it is possible to accurately adjust the DC voltage Vlink or the DC voltage Vint in accordance with the actual loss state of the power conversion device 100. Accordingly, the power loss is further effectively reduced.

Furthermore, the second set time t2, which is the detection interval of the DC current Ibat, is set in accordance with the switching interval of the switching elements of the DC/DC converter 30. By setting the second set time t2 to a short time range as described above, a change in the DC current Ibat can be detected without depending on a change in the DC current Ibat due to the state of charge of the load 6, and the DC voltage Vlink or the DC voltage Vint can be accurately adjusted.

Embodiment 3

Hereinafter, Embodiment 3 of the present disclosure will be described, focusing on the differences from Embodiment 1 described above, with reference to the drawings. The same parts as those in Embodiment 1 described above are designated by the same reference characters, and the description thereof is omitted.

In the first mode and the second mode which are the operation modes for power loss reduction of the power conversion device 100 described above, it is necessary to detect the power losses Ps of the power conversion circuits 10, 20, and 30 or the DC current Ibat to the load 6. In each of the modes, a power detector or a current detector is needed as detection means.

In the present embodiment, a third mode which is an operation mode for power loss reduction using loss characteristic information J and which eliminates the need for a power detector and a current detector, will be described.

Figure 4:
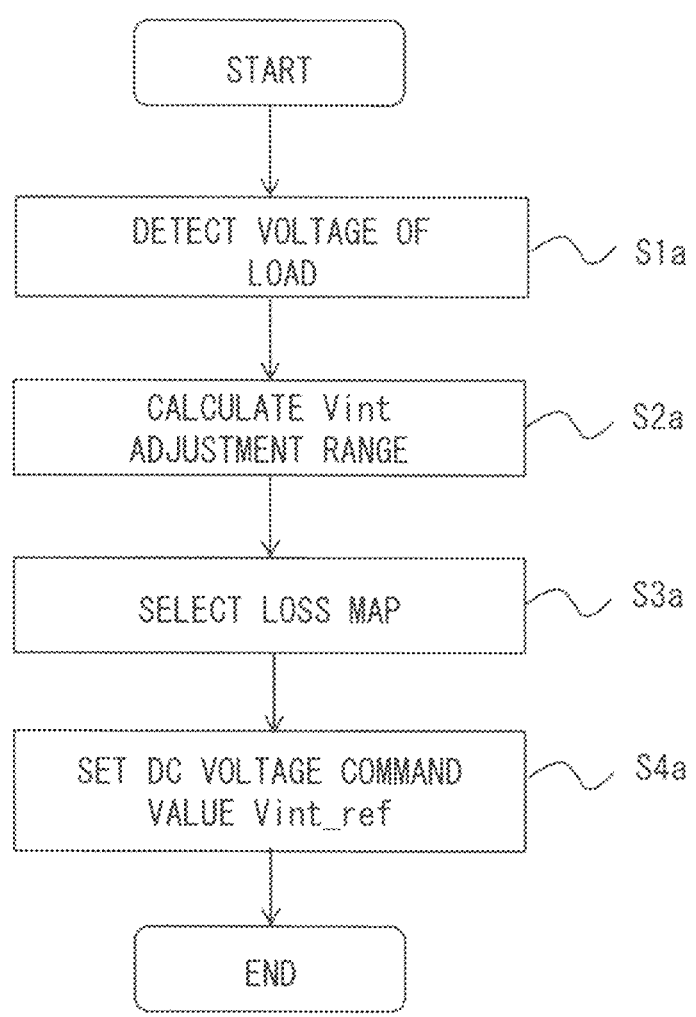
FIG. 4 is a flowchart showing a first example of a third mode which is an operation mode, for power loss reduction, of a control device according to Embodiment 3.

FIG. 4 is a flowchart showing a first example of the third mode, which is an operation mode, for power loss reduction, of the control circuit 50 according to the present Embodiment 3.

Figure 5:
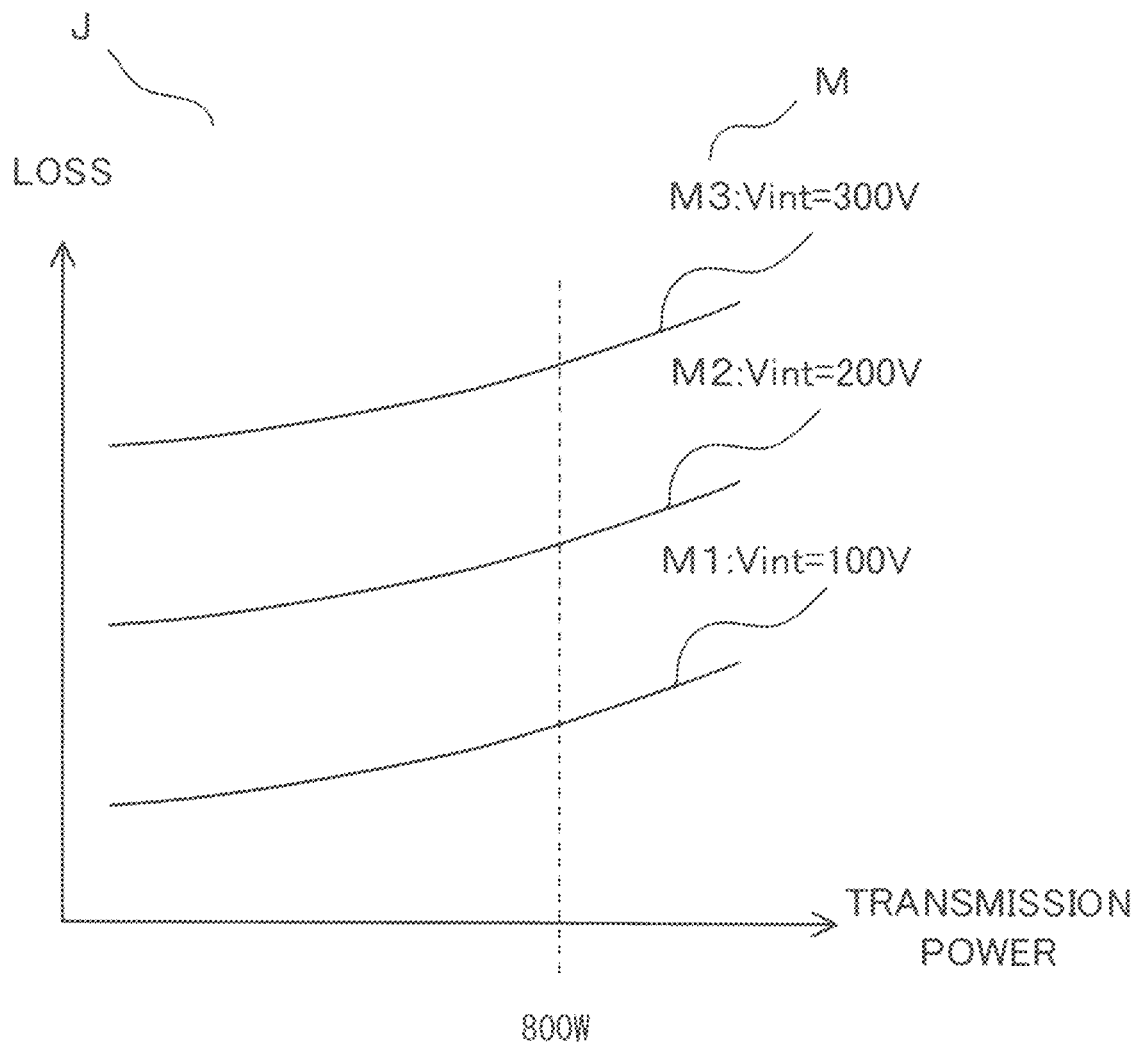
FIG. 5 is a diagram showing loss characteristic information of a power conversion device according to Embodiment 3.

FIG. 5 shows loss characteristic information J in which power loss characteristics of the DC/DC converter 30 when the DC voltage Vbat of the load 6 is 100 V are recorded in the power conversion device 100 according to the present Embodiment 3.

Figure 6:
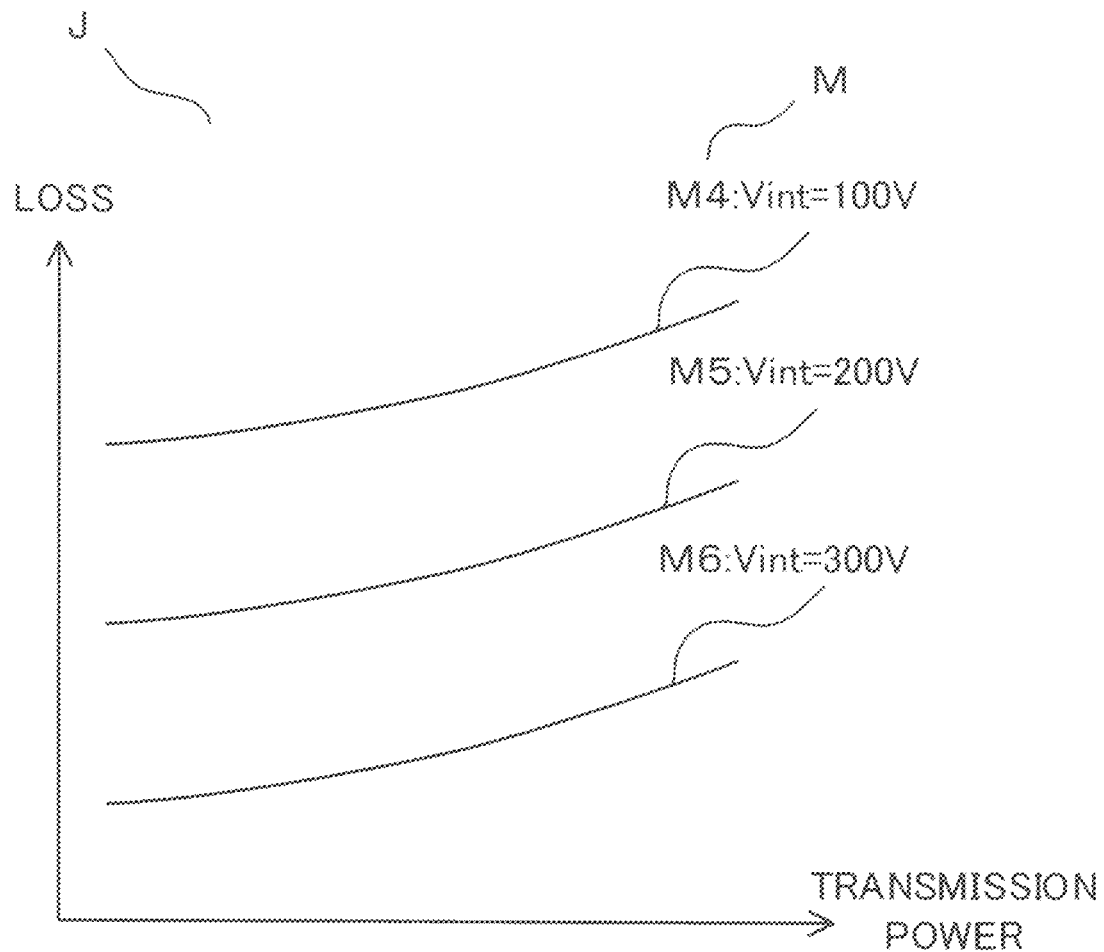
FIG. 6 is a diagram showing loss characteristic information of the power conversion device according to Embodiment 3.

FIG. 6 shows loss characteristic information J in which power loss characteristics of the DC/DC converter 30 when the DC voltage Vbat of the load 6 is 300 V are recorded in the power conversion device 100 according to the present Embodiment 3.

Figure 7:
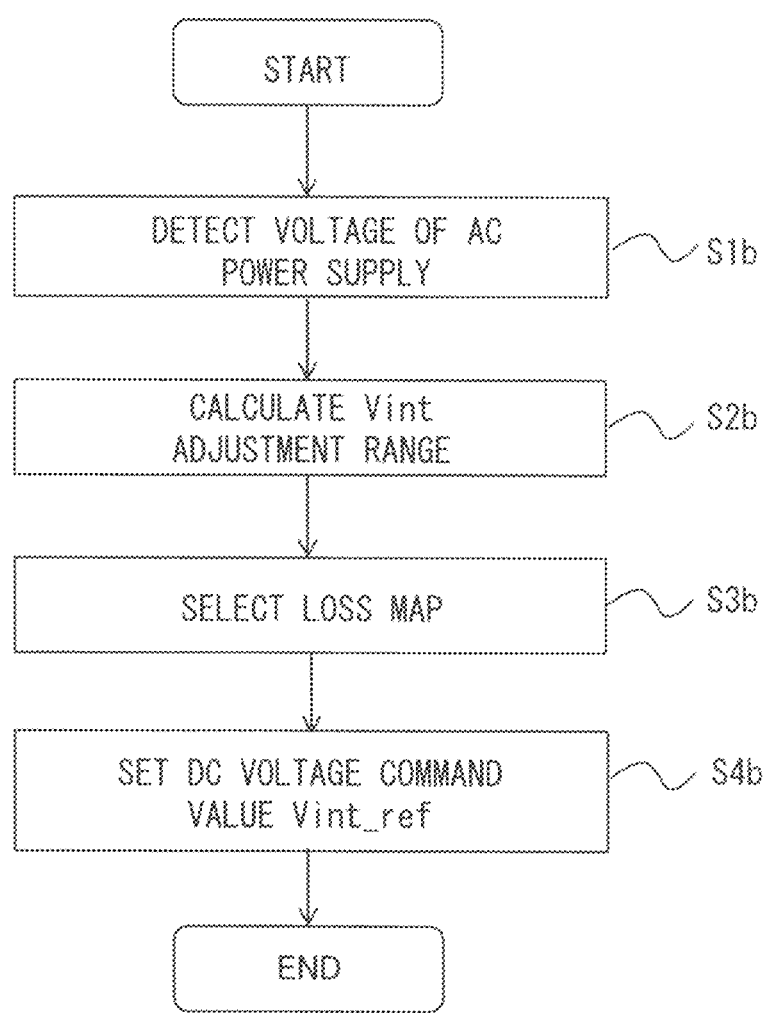
FIG. 7 is a flowchart showing a second example of the third mode which is an operation mode, for power loss reduction, of the control device according to Embodiment 3.

FIG. 7 is a flowchart showing a second example of the third mode, which is an operation mode, for power loss reduction, of the control circuit 50 according to the present Embodiment 3.

Figure 8:
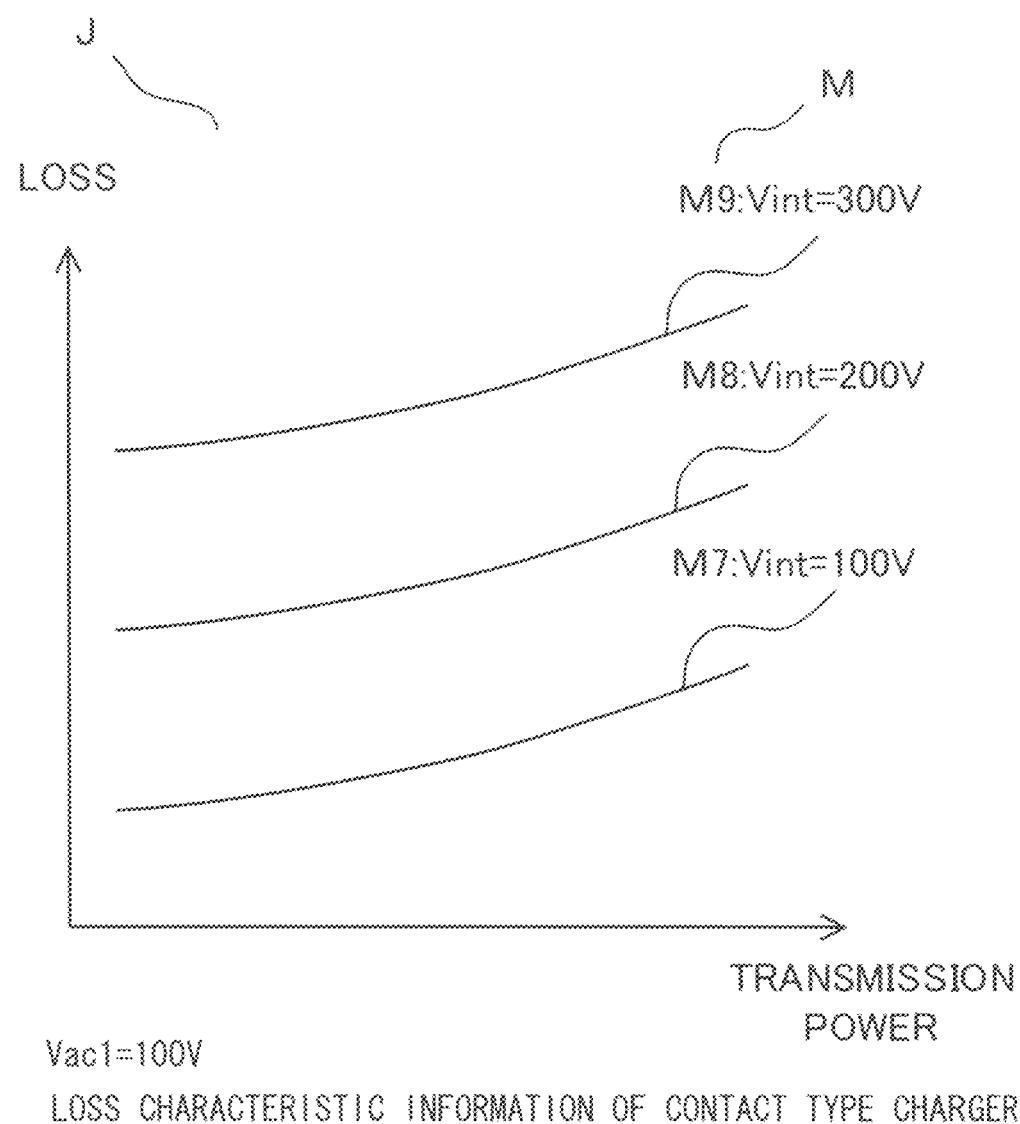
FIG. 8 is a diagram showing loss characteristic information of the power conversion device according to Embodiment 3.

FIG. 8 shows loss characteristic information in which power loss characteristics of the contact type charger 10 when the AC voltage Vac1 is 100 V are recorded in the power conversion device 100 according to the present Embodiment 3.

Figure 9:
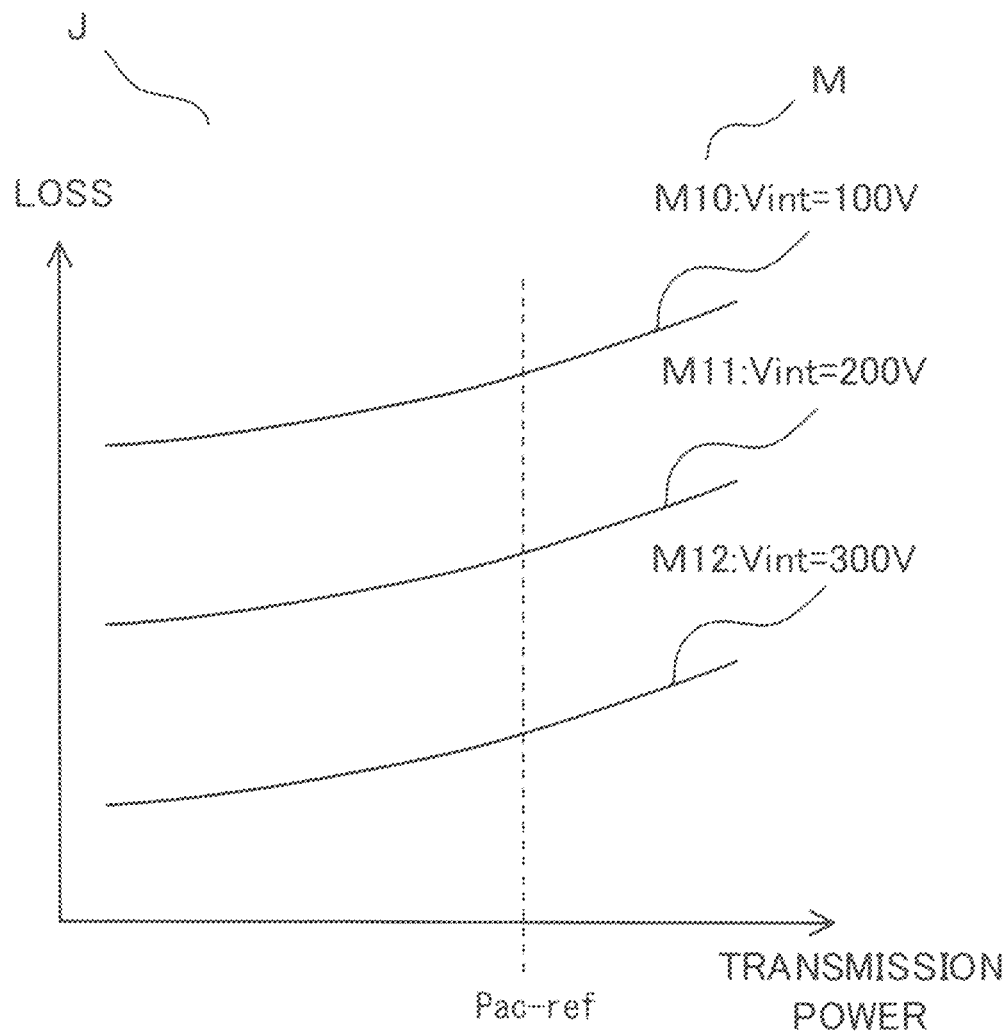
FIG. 9 is a diagram showing loss characteristic information of the power conversion device according to Embodiment 3.

FIG. 9 shows loss characteristic information in which power loss characteristics of the contact type charger 10 when the AC voltage Vac1 is 200 V are recorded in the power conversion device 100 according to the present Embodiment 3.

Figure 10:
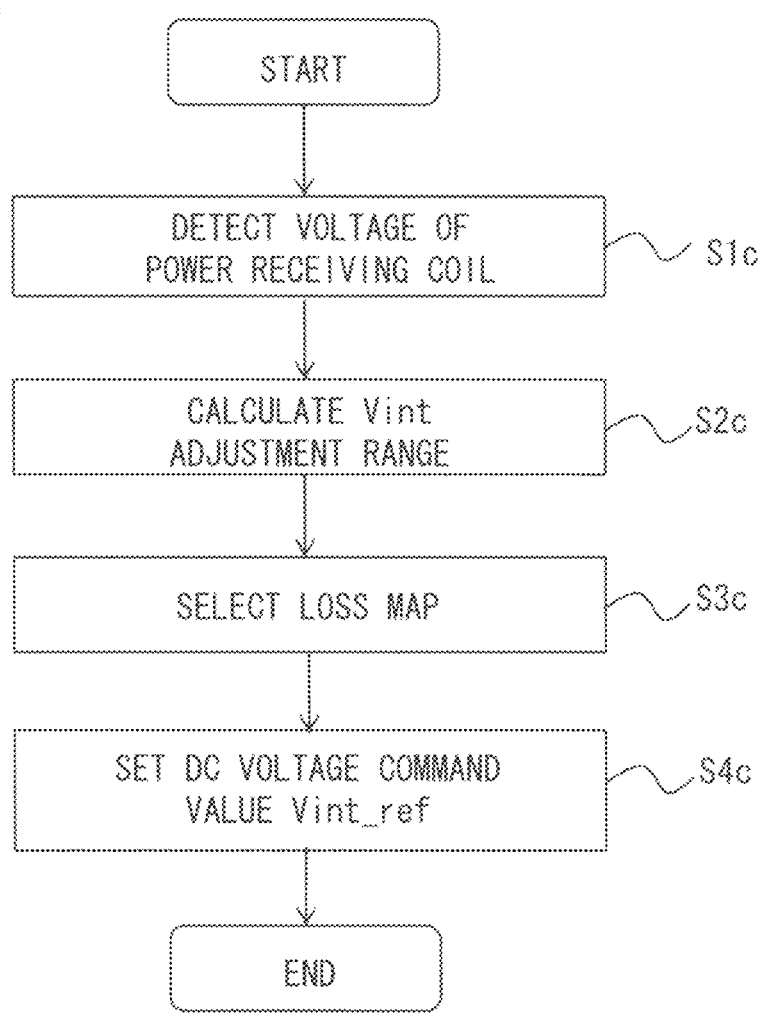
FIG. 10 is a flowchart showing a third example of the third mode which is an operation mode, for power loss reduction, of the control device according to Embodiment 3.

FIG. 10 is a flowchart showing a third example of the third mode, which is an operation mode, for power loss reduction, of the control circuit 50 according to the present Embodiment 3.

Figure 11:
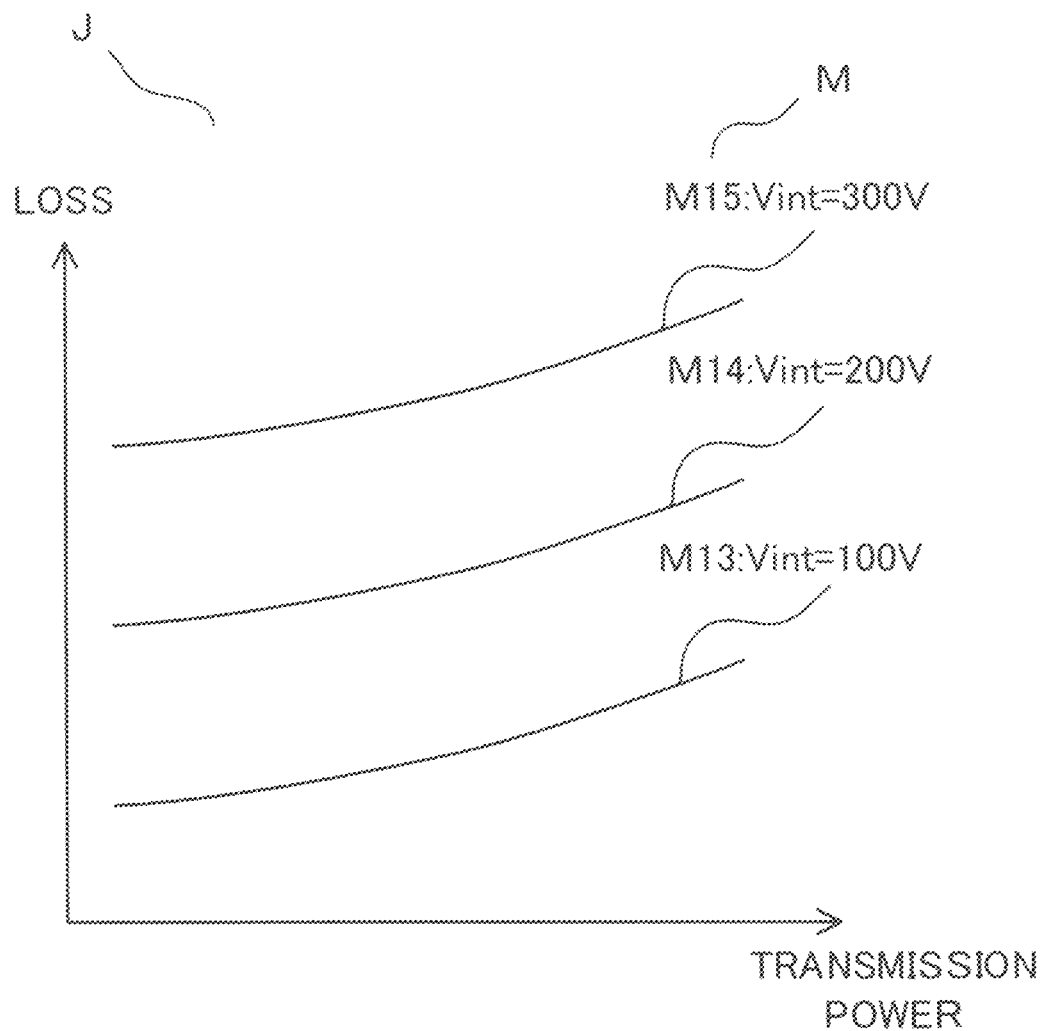
FIG. 11 is a diagram showing loss characteristic information of the power conversion device according to Embodiment 3.

FIG. 11 shows loss characteristic information in which power loss characteristics of the non-contact type charger 20 when the AC voltage Vac2 of the non-contact power receiving coil 20in is low are recorded in the power conversion device 100 according to the present Embodiment 3.

Figure 12:
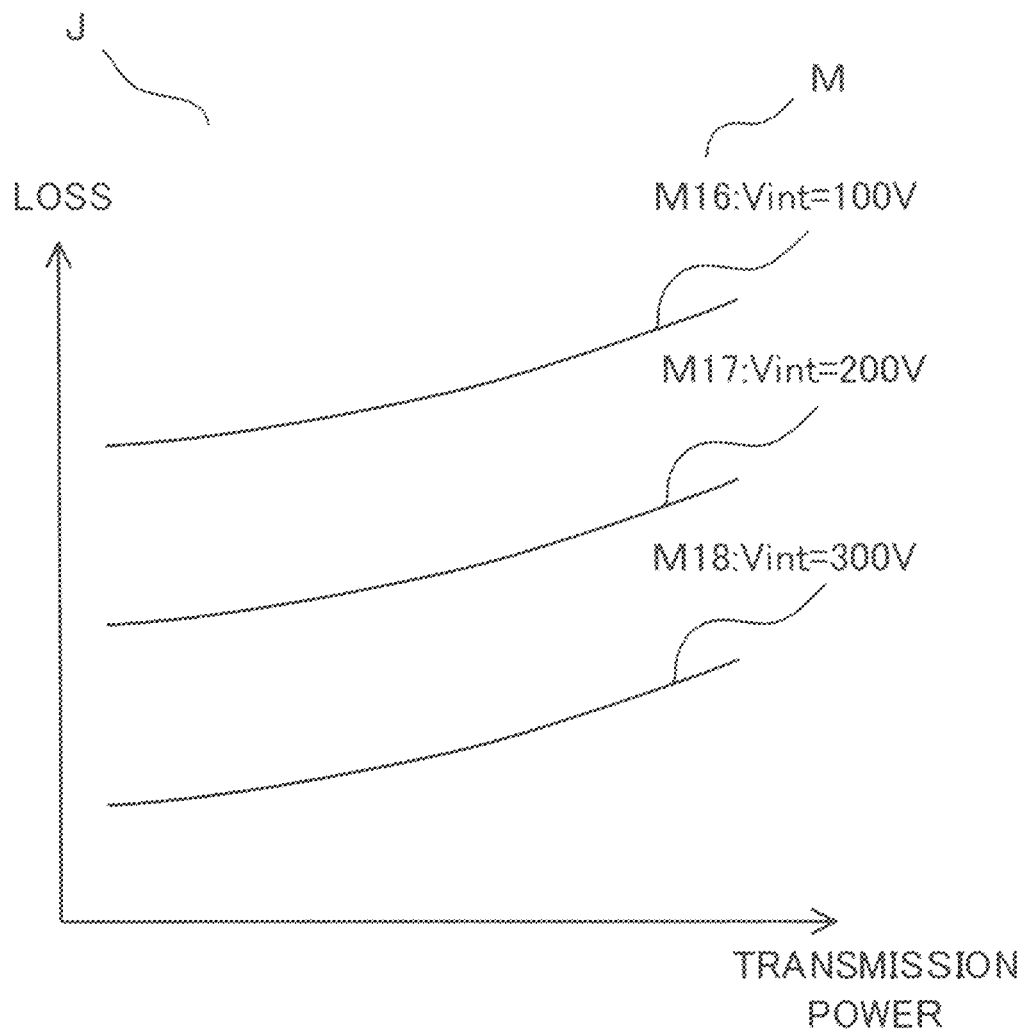
FIG. 12 is a diagram showing loss characteristic information of the power conversion device according to Embodiment 3.

FIG. 12 shows loss characteristic information in which power loss characteristics of the non-contact type charger 20 when the AC voltage Vac2 of the non-contact power receiving coil 20in is high are recorded in the power conversion device 100 according to the present Embodiment 3.

FIG. 4 to FIG. 12 correspond to control in the case of adjusting the DC voltage Vint of the integrated capacitor 5.

The control circuit 50 has the loss characteristic information J in which the power loss characteristics of the DC/DC converter 30, the contact type charger 10, and the non-contact type charger 20 are recorded, as shown in FIG. 5 and FIG. 6, FIG. 8 and FIG. 9, and FIG. 11 and FIG. 12.

The loss characteristic information J is acquired in advance at a test stage of the power conversion device 100 or the like and recorded in the control circuit 50, the horizontal axis indicates the transmission power of each power conversion circuit, and the vertical axis indicates the loss of each power conversion circuit.

The loss characteristic information J includes a plurality of loss maps M (M1, M2 . . . M17, M18) acquired for each DC voltage Vint value of the integrated capacitor 5 (here, Vint=100, 200 V, 300 V).

Although the loss maps M in the case where the value of the DC voltage Vint is changed to three voltage values, that is, 100 V, 200 V, and 300 V, are shown, for example, loss maps M in the case where the value of the DC voltage Vint is more finely changed to 100 V, 120 V, 140 V . . . 280 V, and 300 V may be recorded.

As shown in FIG. 5, each of the loss maps M1, M2, and M3 of the DC/DC converter 30 is recorded so as to correspond to a value (100 V, assuming the time when the load voltage is low) of the DC voltage Vbat of the load 6.

As shown in FIG. 6, each of the loss maps M4, M5, and M6 of the DC/DC converter 30 is recorded so as to correspond to a value (300 V, assuming the time when the load voltage is high) of the DC voltage Vbat of the load 6.

Although the loss maps M corresponding to the two values, 100 V and 300 V, as the value of the DC voltage Vbat of the load 6 are recorded, loss maps M in the case where the value of the DC voltage Vbat of the load 6 is more finely changed may be recorded.

First, control for reducing the power loss of the DC/DC converter 30 will be described with reference to the flowchart in FIG. 4 and the loss characteristic information J of the DC/DC converter 30 shown in FIG. 5 and FIG. 6.

When the control circuit 50 starts the first example of control by the third mode for power loss reduction, the control circuit 50 detects the DC voltage Vbat of the load 6 (step S1a).

Next, the control circuit 50 calculates an adjustable range S in which the DC voltage command value Vint_ref of the integrated capacitor 5 is settable (step S2a).

Since the DC/DC converter 30 has a circuit configuration to perform step-down conversion toward the load 6, the adjustable range S for the DC voltage command value Vint_ref of the integrated capacitor 5 is obtained from the detected DC voltage Vbat and a step-down ratio of the DC/DC converter 30 that is obtained from DC voltage Vbat÷DC voltage Vint.

Assuming that the detected DC voltage Vbat is 100 V and the maximum step-down ratio of the DC/DC converter 30 is 7/10, the adjustable range S for the DC voltage Vint_ref of the integrated capacitor 5 is a voltage range above 142.8 V.

Next, the control circuit 50 refers to the loss map M corresponding to the value of the detected DC voltage Vbat. The loss maps M of the DC/DC converter 30 of the present embodiment are those in two cases, that is, the case shown in FIG. 5 where the value of the DC voltage Vbat is 100 V and the case shown in FIG. 6 where the value of the DC voltage Vbat is 300 V. Since the value of the detected DC voltage Vbat is 100 V, the control circuit 50 refers to the loss characteristic information J in FIG. 5 in the case where the DC voltage Vbat is 100 V.

Then, the control circuit 50 selects the loss map M corresponding to a value in the calculated adjustable range S of the integrated capacitor 5, from among the loss maps M1, M2, and M3 shown in FIG. 5. That is, as described above, since the adjustable range S for the DC voltage Vint_ref of the integrated capacitor 5 is a voltage range above 142.8 V, the control circuit 50 selects two loss maps that are the loss map M2 with DC voltage Vint=200V and the loss map M3 with DC voltage Vint=300 V (step S3a).

Next, in the CC mode, the control circuit 50 refers to the DC current command value Ibat_ref related to control of the DC/DC converter 30, and calculates transmission power of the DC/DC converter 30 from the DC current command value Ibat_ref and the detected DC voltage Vbat.

Assuming that the DC current command value Ibat_ref is 8 A, the transmission power is DC current command value Ibat_ref (8 A)×DC voltage Vbat (100 V)=800 W.

In FIG. 5, when reference is made to each of the loss maps M2 and M3 at a transmission power of 800 W, the loss is smaller in the case of M2 in which the DC voltage Vint is controlled to 200 V.

Thus, the control circuit 50 adjusts the DC voltage Vint of the integrated capacitor 5 to 200 V (step S4a). Accordingly, the power loss of the DC/DC converter 30 can be reduced.

Although the loss maps M in the case where the value of the DC voltage Vint is changed to three voltage values of 100 V, 200 V, and 300 V are shown, loss maps M in the case where the value of the DC voltage Vint is more finely changed to 100 V, 120 V, 140 V . . . 280 V, and 300 V may be recorded as described above. In this case, it is possible to finely adjust the DC voltage Vint.

The control circuit 50 calculates the transmission power of the DC/DC converter 30 from the DC current command value Ibat_ref and the detected DC voltage Vbat, compares the loss maps M2 and M3 at the calculated transmission power, and controls the DC voltage Vint of the integrated capacitor 5.

However, as shown in FIG. 5, with DC voltage Vbat=100 V, regardless of the value of the transmission power, the loss is smaller when the DC voltage Vint of the integrated capacitor 5 is lower. Therefore, the control circuit 50 may omit the above-described calculation of transmission power.

As described above, in the third mode using the loss characteristic information J, the control circuit 50 performs control for loss reduction by the first example using the loss characteristic information J of the DC/DC converter 30.

For example, when the power loss due to the DC/DC converter 30 is dominant in the power loss in the entire power conversion device 100, the power loss Ps can be efficiently reduced by performing control using only the loss characteristic information J of the DC/DC converter 30 by the first example as described above.

Next, control for reducing the power loss of the contact type charger 10 will be described with reference to the flowchart in FIG. 7 and the loss characteristic information J of the contact type charger 10 shown in FIG. 8 and FIG. 9.

As shown in FIG. 8, each of loss maps M7, M8, and M9 of the contact type charger 10 is recorded so as to correspond to a value (100 V, assuming the time when the received voltage is low) of the AC voltage Vac1 of the AC power supply 1.

As shown in FIG. 9, each of loss maps M10, M11, and M12 of the contact type charger 10 is recorded so as to correspond to a value (200 V, assuming the time when the received voltage is high) of the AC voltage Vac1 of the AC power supply 1.

Although the loss maps M corresponding to the two voltage values, 100 V and 200 V, as the value of the AC voltage Vac1 of the AC power supply 1 are recorded, loss maps M in the case where the value of the AC voltage Vac1 of the AC power supply 1 is more finely changed may be recorded.

As shown in FIG. 7, when the control circuit 50 starts the second example of control by the third mode for power loss reduction, the control circuit 50 detects the AC voltage Vac1 of the AC power supply 1 (step S1b).

Next, the control circuit 50 calculates an adjustable range S in which the DC voltage command value Vint_ref of the integrated capacitor 5 is settable (step S2b).

The control circuit 50 calculates the adjustable range S for the DC voltage command value Vint_ref of the integrated capacitor 5 on the basis of the detected AC voltage Vac1 of the AC power supply 1, and the boost and step-down ratios of the AC/DC converter 11 and the isolated DC/DC converter 15 in the contact type charger 10.

Next, the control circuit 50 refers to the loss map M corresponding to the value of the detected AC voltage Vac1 of the AC power supply 1. Specifically, the loss maps M of the present embodiment are those in two cases, that is, the case shown in FIG. 8 where the value of the AC voltage Vac1 is 100 V and the case shown in FIG. 9 where the AC voltage Vac1 is 200 V. Then, similar to step S3a shown in FIG. 4 described above, the control circuit 50 selects the loss map M corresponding to a value in the calculated adjustable range S for the integrated capacitor 5, from among the loss maps M corresponding to the value of the AC voltage Vac1 (step S3b).

Next, in the CP mode, the control circuit 50 refers to the AC power command value Pac_ref related to control of the AC/DC converter 11. Then, the control circuit 50 refers to each of the selected loss maps M at the AC power command value Pac_ref (transmission power), and adjusts the DC voltage Vint of the integrated capacitor 5 (step S4b), similar to step S4a shown in FIG. 4 described above. Similar to step S4a shown in FIG. 4 described above, the control circuit 50 may omit referring to the AC power command value Pac_ref, that is, calculation of transmission power.

As described above, in the third mode using the loss characteristic information J, the control circuit 50 performs control for loss reduction by the second example using the loss characteristic information J of the contact type charger 10.

For example, in the case of operating the contact type charger 10 out of the contact type charger 10 and the non-contact type charger 20, the control in the control circuit 50 can be simplified and the power loss Ps can be efficiently reduced, by performing control using only the loss characteristic information J of the contact type charger 10 by the second example as described above.

Next, control for reducing the power loss of the non-contact type charger 20 will be described with reference to the flowchart in FIG. 10 and the loss characteristic information J of the non-contact type charger 20 shown in FIG. 11 and FIG. 12.

As shown in FIG. 11, each of loss maps M13, M14, and M15 of the contact type charger 10 is recorded so as to correspond to the case where the value of the AC voltage Vac2 of the non-contact power receiving coil 20in is low.

As shown in FIG. 12, each of loss maps M16, M17, and M18 of the contact type charger 10 is recorded so as to correspond to the case where the value of the AC voltage Vac2 of the non-contact power receiving coil 20in is high.

Although the loss maps M corresponding to two voltage values, that is, the case where the value of the AC voltage Vac2 of the non-contact power receiving coil 20in is high and the case where the value of the AC voltage Vac2 of the non-contact power receiving coil 20in is low, are recorded, loss maps M in the case where the value of the AC voltage Vac2 is more finely changed may be recorded.

As shown in FIG. 10, when the control circuit 50 starts the third example of control by the third mode for power loss reduction, the control circuit 50 detects the AC voltage Vac2 of the non-contact power receiving coil 20in (step S1c).

Next, the control circuit 50 calculates an adjustable range S in which the DC voltage command value Vint_ref of the integrated capacitor 5 is settable (step S2c).

Here, the control circuit 50 calculates the adjustable range S for the DC voltage command value Vint_ref of the integrated capacitor 5 on the basis of the detected AC voltage Vac2 of the non-contact power receiving coil 20in.

Next, the control circuit 50 refers to the loss map M corresponding to the value of the detected AC voltage Vac2 of the non-contact power receiving coil 20in. Specifically, the loss maps M of the present embodiment are those in two cases, that is, the case shown in FIG. 11 where the value of the AC voltage Vac2 of the non-contact power receiving coil 20in is low and the case shown in FIG. 12 where the value of the AC voltage Vac2 of the non-contact power receiving coil 20in is high. Similar to step S3a shown in FIG. 4 described above, the control circuit 50 selects the loss map M corresponding to a value in the calculated adjustable range S for the integrated capacitor 5, from among the loss maps M corresponding to the value of the AC voltage Vac2 (step S3c).

Next, the control circuit 50 refers to each of the selected loss maps M of the non-contact type charger 20, and adjusts the DC voltage Vint of the integrated capacitor 5 (step S4c), similar to step S4a shown in FIG. 4 described above.

As described above, in the third mode using the loss characteristic information J, the control circuit 50 performs control for loss reduction by the third example using the loss characteristic information J of the non-contact type charger 20.

For example, in the case of operating the non-contact type charger 20 out of the contact type charger 10 and the non-contact type charger 20, the control in the control circuit 50 can be simplified and the power loss Ps can be efficiently reduced, by performing control using only the loss characteristic information J of the non-contact type charger 20 by the third example as described above.

In the above, the loss maps M of the loss characteristic information J are recorded individually for each DC voltage Vint of the integrated capacitor 5, but may be recorded for each DC voltage Vlink of the DC link capacitor 4. In this case, the control circuit 50 adjusts the DC voltage Vlink of the DC link capacitor 4 on the basis of the loss characteristic information J.

The loss characteristic information J described above is information in which the power loss characteristics of each of the contact type charger 10, the non-contact type charger 20, and the DC/DC converter 30 are recorded. However, the loss characteristic information J is not limited to such a configuration, and may be information in which the total power loss characteristics of the contact type charger 10, the non-contact type charger 20, and the DC/DC converter 30 are recorded.

For example, in the case of simultaneously operating the contact type charger 10 and the non-contact type charger 20, a possibility that the loss of the non-contact type charger 20 will extremely increase when the DC voltage command value Vint_ref with which the loss is minimized in the contact type charger 10 is selected, is assumed. In such a case, as described above, the DC voltage command value Vint_ref that reduces the total power loss in the entire power conversion device 100 may be selected on basis of the loss characteristic information J in which the total power loss characteristics of the contact type charger 10, the non-contact type charger 20, and the DC/DC converter 30 that reduce the total loss are recorded.

In the CC mode, in the case of using the loss characteristic information J in which the total power loss is recorded as described above, the control circuit 50 performs control similar to that in the flowchart shown in FIG. 4. In this case, in the case of selecting a loss map M using transmission power, in the CC mode, in step S4 in FIG. 4, the control circuit 50 calculates the transmission power of the entire power conversion device 100 from the DC current command value Ibat_ref and the detected DC voltage Vbat. Then, the control circuit 50 selects a loss map M on the basis of the calculated transmission power of the entire power conversion device 100.

In the CP mode, in the case of using the loss characteristic information J in which the total power loss is recorded as described above, and further selecting a loss map M using transmission power, the control circuit 50 calculates the transmission power of the entire power conversion device 100 from the AC voltage Vac2 and the AC current of the non-contact power receiving coil 20in and the AC power command value Pac_ref. Then, the control circuit 50 selects a loss map M on the basis of the calculated transmission power of the entire power conversion device 100.

Although the example in which the DC voltage Vint of the integrated capacitor 5 is adjusted has been described above, similar control can also be performed for the DC voltage Vlink of the DC link capacitor 4. In this case, the loss characteristic information J includes a plurality of loss maps M acquired for each DC voltage Vlink value of the DC link capacitor 4.

The power conversion device 100 of the present embodiment configured as described above provides the same effects as Embodiment 1, and can simultaneously perform power supply with the power supply function by the wired method and the power supply function by the wireless method, regardless of the values of the received voltages on the wired method side and the wireless method side.

Furthermore, the control circuit 50 has the loss characteristic information J in which the power loss characteristics of the contact type charger 10, the non-contact type charger 20, and the DC/DC converter 30 are recorded, and has the third mode in which the control circuit 50 adjusts the DC voltage Vlink of the DC link capacitor 4 or the DC voltage Vint of the integrated capacitor 5 on the basis of the loss characteristic information J. Since the value of the DC voltage Vint with which the power loss is minimized is recorded in the loss characteristic information J as described above, the time from the start of loss reduction by the third mode to setting of the DC voltage Vint can be significantly shortened, so that the power loss can be quickly minimized.

The loss characteristic information J is information in which the power loss characteristics of the contact type charger 10 and the non-contact type charger 20 corresponding to the value of the input voltage (the AC voltages Vac1 and Vac2) and the power loss characteristics of the DC/DC converter 30 corresponding to the value of the output voltage (the DC voltage Vbat of the load 6) are recorded. By configuring the loss characteristic information J based on the characteristics of the converters that change depending on the input and output voltages as described above, the DC voltage Vlink or the DC voltage Vint can be further accurately controlled.

The loss characteristic information J includes a plurality of loss maps M in which the power loss characteristics of the contact type charger 10, the non-contact type charger 20, and the DC/DC converter 30 are recorded so as to correspond to the DC voltage Vlink or the DC voltage Vint. The control circuit 50 selects the loss map M corresponding to a value in the adjustable range S for the DC voltage Vlink or the DC voltage Vint, from among the plurality of loss maps M. Since the DC voltage Vlink or the DC voltage Vint is adjusted on the basis of the adjustable range S in which actual setting is possible as described above, the operating state of the power conversion device 100 can be stabilized.

In the case of supplying DC power to the load 6 using only the contact type charger 10, the control circuit 50 uses the loss characteristic information J in which the power loss characteristics of the contact type charger 10 are recorded. In the case of supplying DC power to the load 6 using only the non-contact type charger 20, the control circuit 50 uses the loss characteristic information J in which the power loss characteristics of the non-contact type charger 20 are recorded.

By performing control using the loss characteristic information J of a charger to be operated out of the contact type charger 10 and the non-contact type charger 20 as described above, the control in the control circuit 50 can be simplified and the DC voltage Vlink or the DC voltage Vint can be quickly adjusted.

In the case of supplying DC power from both the contact type charger 10 and the non-contact type charger 20 to the load 6, the loss characteristic information J in which total power loss characteristics of both the contact type charger 10 and the non-contact type charger 20 are recorded, can be used. Furthermore, the loss characteristic information J in which the total power loss characteristics of the contact type charger 10, the non-contact type charger 20, and the DC/DC converter 30 are recorded, can also be used. Accordingly, the power loss in the entire power conversion device 100 can be minimized.

Embodiment 4

Hereinafter, Embodiment 4 of the present disclosure will be described, focusing on the differences from Embodiments 1 to 3 described above, with reference to the drawing. The same parts as those in Embodiment 1 described above are designated by the same reference characters, and the description thereof is omitted.

Figure 13:
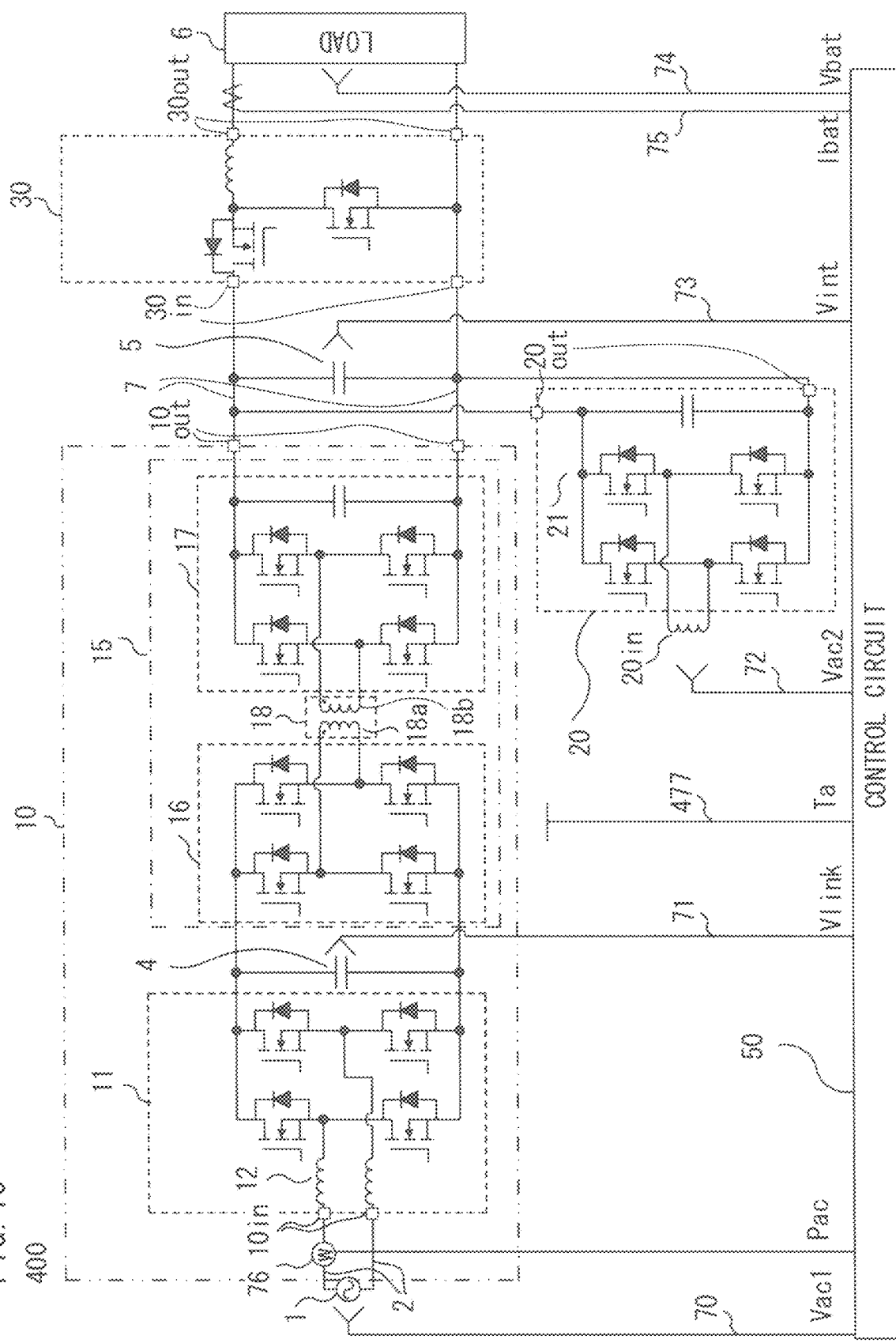
FIG. 13 is a schematic configuration diagram showing a power conversion device according to Embodiment 4.

FIG. 13 is a schematic configuration diagram showing a power conversion device 400 according to Embodiment 4.

As shown in the drawing, the power conversion device 400 includes an environmental information sensor 477 that acquires environmental information such as temperature information Ta of the respective power conversion circuits 10, 20, and 30 of the power conversion device 100.

The control circuit 50 switches between the first mode described in Embodiment 1, the second mode described in Embodiment 2, and the third mode described in Embodiment 3, on the basis of the acquired temperature information Ta.

For example, it is assumed that the control circuit 50 performs control for power loss reduction by the third mode using the loss characteristic information J. However, when a rise in the temperature of each of the power conversion circuits 10, 20, and 20 is detected on the basis of the temperature information Ta acquired by the environmental information sensor 477, the control circuit 50 switches to the first mode in which the actual power loss Ps is detected and the DC voltage Vlink or the DC voltage Vint is adjusted.

Since the loss characteristic information J to be used in the third mode is based on the power loss characteristics acquired in advance at a test stage or the like, when the temperatures of the power conversion circuits 10, 20, and 30 rise, there is a possibility that a deviation will occur between the power loss characteristics recorded in the loss characteristic information J and the actual power loss characteristics of the power conversion circuits 10, 20, and 30. By acquiring environmental information based on the actual operating state of the power conversion device 100 and selecting a mode corresponding to the environmental information as described above, the control circuit 50 can further accurately reduce the power loss.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 AC power supply
4 DC link capacitor (first DC capacitor)
5 integrated capacitor (second DC capacitor)
10 contact type charger (first power conversion circuit)
11 AC/DC converter (first converter circuit)
15 isolated DC/DC converter (second converter circuit)
20 non-contact type charger (second power conversion circuit)
30 DC/DC converter (third power conversion circuit)
50 control circuit
477 environmental information sensor
100, 400 power conversion device

The invention claimed is:

1. A power conversion device comprising:
a first power conversion circuit connected at a first end to an AC power supply and having a first converter circuit for converting an input voltage from the AC power supply to a DC voltage, and a second converter circuit for boosting or stepping down the DC voltage resulting from the conversion by the first converter circuit and outputting a second DC voltage through a second end;
a second power conversion circuit having a non-contact power receiving coil as a first end for receiving power in a non-contact manner by magnetically coupling with a power transmission coil of a power transmission device, and a third converter circuit for converting an AC voltage received from the non-contact power receiving coil to a third DC voltage and outputting the third DC voltage through a second end;
a third power conversion circuit connected at a second end to a load, the third power conversion circuit being for boosting or stepping down a fourth DC voltage inputted through a first end and performing power supply to the load;
a first DC capacitor and a second DC capacitor each for smoothing a DC voltage; and
a control circuit for controlling the first power conversion circuit, the second power conversion circuit, and the third power conversion circuit, wherein
the second end of the first power conversion circuit and the second end of the second power conversion circuit are connected to the first end of the third power conversion circuit via an integrated bus, the first DC capacitor is connected between the first converter circuit and the second converter circuit, and the second DC capacitor is connected to the integrated bus, thereby allowing DC power outputted from at least either the first power conversion circuit or the second power conversion circuit to be supplied to the load via the third power conversion circuit,
the control circuit adjusts a DC voltage of the first DC capacitor or a DC voltage of the second DC capacitor such that a power loss of at least one of the first power conversion circuit, the second power conversion circuit, and the third power conversion circuit is reduced,
the control circuit has loss characteristic information in which a power loss characteristic of at least one of the first power conversion circuit, the second power conversion circuit, and the third power conversion circuit is recorded, and
the control circuit has a third mode in which the control circuit adjusts the DC voltage of the first DC capacitor or the second DC capacitor on the basis of the loss characteristic information, and wherein, in the loss characteristic information,
power loss characteristics of the first power conversion circuit and the second power conversion circuit corresponding to respective input voltages of the first power conversion circuit and the second power conversion circuit are recorded, and
a power loss characteristic of the third power conversion circuit corresponding to a voltage of the load is recorded.

2. The power conversion device according to claim 1, wherein the control circuit has a first mode in which the control circuit detects a power loss of at least one of the first power conversion circuit, the second power conversion circuit, and the third power conversion circuit every first set time, when a detected latest power loss is less than a power loss detected the first set time before, the control circuit adds a set correction value to a voltage command value of the first DC capacitor or the second DC capacitor, when the detected latest power loss is equal to or larger than the power loss detected the first set time before, the control circuit adds the correction value having an inverted polarity to the voltage command value of the first DC capacitor or the second DC capacitor, and the control circuit adjusts the DC voltage of the first DC capacitor or the second DC capacitor.

3. The power conversion device according to claim 1, further comprising a current detector for detecting an output current of the third power conversion circuit, wherein the control circuit has a second mode in which the control circuit adjusts the DC voltage of the first DC capacitor or the second DC capacitor such that the detected output current of the third power conversion circuit is maximized.

4. The power conversion device according to claim 3, wherein, in the second mode, the control circuit detects the output current of the third power conversion circuit every second set time, when a detected latest output current is equal to or larger than an output current detected the second set time before, the control circuit adds a set correction value to a voltage command value of the first DC capacitor or the second DC capacitor, when the detected latest output current is less than the output current detected the second set time before, the control circuit adds the correction value having an inverted polarity to the voltage command value of the first DC capacitor or the second DC capacitor, and the control circuit adjusts the DC voltage of the first DC capacitor or the second DC capacitor.

5. The power conversion device according to claim 4, wherein the second set time is set in accordance with a switching interval of a switching element of the third power conversion circuit.

6. The power conversion device according to claim 1, further comprising a voltage detector for detecting a DC voltage of the load, wherein the loss characteristic information includes a plurality of loss maps in which power loss characteristics of the first power conversion circuit, the second power conversion circuit, and the third power conversion circuit are recorded so as to correspond to each DC voltage value of the second DC capacitor, and in the third mode, the control circuit calculates an adjustable range for the DC voltage of the second DC capacitor on the basis of the detected DC voltage of the load, the control circuit selects the loss map corresponding to a value in the calculated adjustable range for the second DC capacitor, from among the plurality of loss maps, and the control circuit adjusts the DC voltage of the second DC capacitor on the basis of the selected loss map.

7. The power conversion device according to claim 1, further comprising a voltage detector for detecting a voltage of the AC power supply, wherein the loss characteristic information includes a plurality of loss maps in which power loss characteristics of the first power conversion circuit, the second power conversion circuit, and the third power conversion circuit are recorded so as to correspond to each DC voltage value of the first DC capacitor, and in the third mode, the control circuit calculates an adjustable range for the DC voltage of the first DC capacitor on the basis of the detected voltage of the AC power supply, the control circuit selects the loss map corresponding to a value in the calculated adjustable range for the first DC capacitor, from among the plurality of loss maps, and the control circuit adjusts the DC voltage of the first DC capacitor on the basis of the selected loss map.

8. The power conversion device according to claim 1, wherein, in the third mode, the control circuit supplies DC power to the load using only the first power conversion circuit, and the control circuit adjusts the DC voltage of the first DC capacitor or the second DC capacitor on the basis of the loss characteristic information of the first power conversion circuit.

9. The power conversion device according to claim 1, wherein, in the third mode, the control circuit supplies the DC power from the second power conversion circuit to the load using only the second power conversion circuit, and the control circuit adjusts the DC voltage of the second DC capacitor on the basis of the loss characteristic information of the second power conversion circuit.

10. The power conversion device according to claim 1, wherein a total power loss characteristic which is a sum of the power loss characteristics of the first power conversion circuit, the second power conversion circuit, and the third power conversion circuit is recorded in the loss characteristic information, and in the third mode, the control circuit supplies total DC power from the first power conversion circuit and the second power conversion circuit to the load using the first power conversion circuit and the second power conversion circuit, and the control circuit adjusts the DC voltage of the first DC capacitor or the second DC capacitor on the basis of the loss characteristic information in which the total power loss characteristic is recorded.

11. The power conversion device according to claim 1, wherein the control circuit adjusts the DC voltage of the second DC capacitor by controlling a switching element of the second converter circuit.

12. The power conversion device according to claim 1, wherein the control circuit adjusts the DC voltage of the second DC capacitor by controlling a switching element of the third power conversion circuit.

13. The power conversion device according to claim 1, wherein the control circuit adjusts the DC voltage of the first DC capacitor by controlling a switching element of the first converter circuit.

14. The power conversion device according to claim 1, wherein the control circuit adjusts the DC voltage of the first DC capacitor by controlling a switching element of the second converter circuit.

15. The power conversion device according to claim 1, wherein the second converter circuit includes: an inverter circuit for converting the DC voltage resulting from the conversion by the first converter circuit, to an AC voltage; an isolation transformer for receiving and isolating the AC voltage from the inverter circuit at a primary side and supplying the AC voltage to a secondary side; and a fourth converter circuit for converting the AC voltage received from the secondary side of the isolation transformer to the second DC voltage.

16. A power conversion device comprising:
a first power conversion circuit connected at a first end to an AC power supply and having a first converter circuit for converting an input voltage from the AC power supply to a DC voltage, and a second converter circuit for boosting or stepping down the DC voltage resulting from the conversion by the first converter circuit and outputting a second DC voltage through a second end;
a second power conversion circuit having a non-contact power receiving coil as a first end for receiving power in a non-contact manner by magnetically coupling with a power transmission coil of a power transmission device, and a third converter circuit for converting an AC voltage received from the non-contact power receiving coil to a third DC voltage and outputting the third DC voltage through a second end;
a third power conversion circuit connected at a second end to a load, the third power conversion circuit being for boosting or stepping down a fourth DC voltage inputted through a first end and performing power supply to the load;
a first DC capacitor and a second DC capacitor each for smoothing a DC voltage; and
a control circuit for controlling the first power conversion circuit, the second power conversion circuit, and the third power conversion circuit, wherein
the second end of the first power conversion circuit and the second end of the second power conversion circuit are connected to the first end of the third power conversion circuit via an integrated bus, the first DC capacitor is connected between the first converter circuit and the second converter circuit, and the second DC capacitor is connected to the integrated bus, thereby allowing DC power outputted from at least either the first power conversion circuit or the second power conversion circuit to be supplied to the load via the third power conversion circuit,
the control circuit adjusts a DC voltage of the first DC capacitor or a DC voltage of the second DC capacitor such that a power loss of at least one of the first power conversion circuit, the second power conversion circuit, and the third power conversion circuit is reduced,
the control circuit has a first mode in which
the control circuit detects a power loss of at least one of the first power conversion circuit, the second power conversion circuit, and the third power conversion circuit every first set time,
when a detected latest power loss is less than a power loss detected the first set time before, the control circuit adds a set correction value to a voltage command value of the first DC capacitor or the second DC capacitor,
when the detected latest power loss is equal to or larger than the power loss detected the first set time before, the control circuit adds the correction value having an inverted polarity to the voltage command value of the first DC capacitor or the second DC capacitor, and
the control circuit adjusts the DC voltage of the first DC capacitor or the second DC capacitor,
the power conversion device further comprising:
a current detector for detecting an output current of the third power conversion circuit; and
an environmental information sensor for acquiring environmental information of the power conversion device, wherein
the control circuit has
the first mode,
a second mode in which the control circuit adjusts the DC voltage of the first DC capacitor or the second DC capacitor such that the detected output current of the third power conversion circuit is maximized, and
a third mode in which the control circuit has loss characteristic information in which loss characteristics of the first power conversion circuit, the second power conversion circuit, and the third power conversion circuit are recorded, and adjusts the DC voltage of the first DC capacitor or the second DC capacitor on the basis of the loss characteristic information, and
the control circuit switches between the first mode, the second mode, and the third mode on the basis of the acquired environmental information.

* * * * *